United States Patent
Kashiwabara et al.

(10) Patent No.: US 9,086,114 B2
(45) Date of Patent: Jul. 21, 2015

(54) LIQUID SEALED MOUNT

(75) Inventors: Shin Kashiwabara, Hiratsuka (JP);
Toshio Yamashita, Hiratsuka (JP);
Masayuki Konishi, Hiratsuka (JP);
Shinji Mitsuta, Hiratsuka (JP);
Masatake Tamaru, Tokyo (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 516 days.

(21) Appl. No.: 13/122,472

(22) PCT Filed: Oct. 2, 2009

(86) PCT No.: PCT/JP2009/067242
§ 371 (c)(1),
(2), (4) Date: May 9, 2011

(87) PCT Pub. No.: WO2010/038865
PCT Pub. Date: Apr. 8, 2010

(65) Prior Publication Data
US 2011/0221107 A1    Sep. 15, 2011

(30) Foreign Application Priority Data

Oct. 3, 2008 (JP) ................................ 2008-258923

(51) Int. Cl.
*F16F 13/08*    (2006.01)
*F16F 9/36*    (2006.01)
(Continued)

(52) U.S. Cl.
CPC ................ *F16F 13/08* (2013.01); *F16F 9/065* (2013.01); *F16F 9/363* (2013.01); *F16F 9/43* (2013.01); *F16F 13/10* (2013.01)

(58) Field of Classification Search
USPC ................ 267/140.13, 140.11, 140.4, 141.3, 267/141.4, 141.5, 219
See application file for complete search history.

(56) References Cited

U.S. PATENT DOCUMENTS 4,416,445 A    11/1983    Coad
5,632,472 A *    5/1997    Kato et al. ............... 267/140.13
(Continued)

FOREIGN PATENT DOCUMENTS

EP    1359342 A1    11/2003
JP    55-054740 A    4/1980
(Continued)

OTHER PUBLICATIONS

International Search Report mailed Dec. 8, 2009 from International Application No. PCT/JP2009/067242, 2 pages.
(Continued)

*Primary Examiner* — Melanie Torres Williams
(74) *Attorney, Agent, or Firm* — Fish & Richardson P.C.

(57) ABSTRACT

A hydraulic mount includes: a container in which a high-viscosity fluid is liquid-tightly sealed; a rubber mount that is provided on an upper side of the container; a rod that slidably penetrates through the rubber mount; a damper plate that is provided to an end of the rod; a damping force generator that is provided by a clearance between the container and the damper plate; a main fluid chamber that includes an upper fluid chamber and a lower fluid chamber provided by dividing an interior of the container by the damper plate; a volume-variable secondary fluid chamber that communicates with the main fluid chamber; and a pressurizer that generates a differential pressure between the upper fluid chamber and the lower fluid chamber during the movement of the rod.

10 Claims, 17 Drawing Sheets

(51) Int. Cl.
  *F16F 9/43* (2006.01)
  *F16F 13/10* (2006.01)
  *F16F 9/06* (2006.01)

(56) References Cited

U.S. PATENT DOCUMENTS

| | | |
|---|---|---|
| 2003/0047882 A1 | 3/2003 | Nakada et al. |
| 2009/0017783 A1 | 1/2009 | Li et al. |
| 2009/0107783 A1 | 4/2009 | Ota |

FOREIGN PATENT DOCUMENTS

| | | |
|---|---|---|
| JP | S55-054750 A | 4/1980 |
| JP | 58-063436 U | 4/1983 |
| JP | 4-092139 A | 3/1992 |
| JP | 6-257638 A | 9/1994 |
| JP | 2003-83390 A | 3/2003 |
| JP | 2003-083399 A | 3/2003 |
| JP | 57-161331 A | 4/2003 |
| JP | 2003-113889 A | 4/2003 |
| JP | 2003-130127 A | 5/2003 |
| JP | 2003-343636 A | 12/2003 |
| JP | 2004-353772 A | 12/2004 |
| JP | 2004-353858 A | 12/2004 |
| JP | 2005-048917 A | 2/2005 |
| JP | 2005-170212 A | 6/2005 |
| JP | 2005-188667 A | 7/2005 |
| JP | 2005-331087 A | 12/2005 |
| JP | 2007-132359 A | 5/2007 |
| JP | 2008-095822 A | 4/2008 |
| JP | 2008-121811 A | 5/2008 |

OTHER PUBLICATIONS

Notice of Reason(s) for Rejection dated Jan. 15, 2013 from Japanese Application No. 2008-258923, including English translation, 6 pages.

Notice of Reason(s) for Rejection, issued Jun. 18, 2013 in corresponding Japanese Application No. 2008-258923, including English translation, 6 pages.

\* cited by examiner

LIQUID SEALED MOUNT

CROSS REFERENCE TO RELATED APPLICATIONS

This application claims priority to Application No. PCT/JP2009/067242 filed on Oct. 2, 2009, which application claims priority to Application No. JP 2008-258923 filed on Oct. 3, 2008. The entire contents of both applications are incorporated herein by reference in their entireties.

TECHNICAL FIELD

The present invention relates to a hydraulic mount. In particular, the present invention relates to a hydraulic mount interposed between the cab and vehicle body frame of a construction machine.

BACKGROUND ART

Typically, a construction machine, such as a bulldozer or an excavator, designed to work on an uneven terrain includes an operation/control cab provided on a vehicle body frame to which a carriage is attached. As compared with a general vehicle, a large external force is transmitted to the cab from the vehicle body frame. In view of this, the cab is mounted on the vehicle body frame via an anti-vibration mount that functions as a vibration suppressor.

A so-called hydraulic mount has been known as an anti-vibration mount (see, for instance, Patent Literature 1).

FIG. 17 shows a hydraulic mount 90 disclosed in Patent Literature 1. The hydraulic mount 90 includes: a cup-shaped container 91; a cylindrical plate 92 provided to the upper opening of the container 91; a rubber mount 97 fixed to the cylindrical plate 92; a collar 98 fixed to the rubber mount 97; a rod 93 vertically penetrating through the collar 98; a damper plate 94 bolded to the lower end of the rod 93; and a spring 95 interposed between the lower surface of the damper plate 94 and the bottom of the container 91.

A high-viscosity fluid 96 such as silicone oil is sealed in the container 91. The interior of the container 91 is divided into a lower fluid chamber 911 defined at the lower side of the damper plate 94 and an upper fluid chamber 912 defined at the upper side of the damper plate 94.

The rubber mount 97 having elasticity is fixed to the cylindrical portion of the cylindrical plate 92. The cylindrical collar 98 vertically penetrates the rubber mount 97 and is bonded to the rubber mount 97 by vulcanizing adhesion or the like. A bearing 102 and a seal ring 99 are attached to the inner circumference of the collar 98, and the rod 93 penetrates through the bearing 102 and the seal ring 99 in a vertically slidable manner.

Above the upper fluid chamber 912, an air chamber 100 is provided by a depression formed in the lower surface of the rubber mount 97.

In the hydraulic mount 90, the respective flanges of the container 91 and the cylindrical plate 92 are fixed to a vehicle body frame (not shown) using a bolt while the upper end of the rod 93 is bolted to the lower surface of a cab (not shown). Thus, the cab is supported on the vehicle body frame via the spring 95.

Horizontal vibration of the cab relative to the vehicle body frame is absorbed and damped by elastic deformation of the rubber mount 97 caused when the rod 93 is pressed against the rubber mount 97. In contrast, vertical vibration of the cab relative to the vehicle body frame is absorbed mainly by elastic deformation of the spring 95 while being damped by fluid resistance resulting from the movement of the damper plate 94 in the high-viscosity fluid 96.

The damping effect on the vertical vibration will be described below in detail. When, for instance, the rod 93 is pressed into the container 91 in response to the vertical vibration of the cab, the downward movement of the damper plate 94 forces the high-viscosity fluid 96 in the lower fluid chamber 911 to flow into the upper fluid chamber 912 through a clearance 101 defined between the outer circumference of the damper plate 94 and the inner circumference of the container 91, and the resulting fluid resistance (shear resistance) generates a damping force.

When the rod 93 moves upward after being pressed, the high-viscosity fluid 96 reversely flows from the upper fluid chamber 912 into the lower fluid chamber 911.

An arrangement where an engine mounted on a vehicle is supported via a hydraulic mount has been frequently employed (see, for instance, Patent Literatures 2 and 3).

In a hydraulic mount disclosed in Patent Literature 2, an engine is supported by an elastic support plate in a vibration-proof manner. A fluid chamber is formed below the support plate and is divided into upper and lower parts by a partition plate with an orifice. The lower part of the fluid chamber is closed by an elastic thin plate.

When, for instance, the support plate is moved downward to be deformed in response to vertical vibration, the volume of the upper part of the fluid chamber is reduced, so that a fluid in the upper part of the fluid chamber flows into the lower part of the fluid chamber through the orifice. When the flowing fluid passes through the orifice, the resulting fluid resistance generates a damping force. The elastic thin plate covering the lower part of the fluid chamber is elastically deformed in accordance with the amount of the fluid flowing from the upper part to increase the volume of the lower part of the fluid chamber.

When the support plate returns upward, the volume of the upper part of the fluid is increased, so that the fluid reversely flows into the upper part from the lower part of the fluid chamber. The mechanism to generate the damping force uses the fluid resistance caused when the fluid passes through the orifice. The function of the orifice resistance according to Patent Literature 2 is substantially the same as that of the shear resistance caused by the damper plate according to Patent Literature 1.

In a hydraulic mount disclosed in Patent Literature 3, a damper plate is integrally provided to the lower surface of a support plate that is substantially the same as that of Patent Literature 2, and is housed in a fluid chamber. Thus, the fluid chamber is likewise divided into upper and lower parts by the damper plate. The bottom of the fluid chamber is closed by an elastic thin plate and is elastically deformed following a change in the volume of the fluid chamber resulting from the deformation of the support plate. This is basically the same as the technique of Patent Literature 2.

However, in Patent Literature 3, a mechanism to generate a damping force uses shear resistance resulting from the movement of the damper plate in the fluid chamber, which is substantially the same as in Patent Literature 1.

Incidentally, in the hydraulic mounts of Patent Literatures 2 and 3, a mounted object such as an engine is supported via a rubber support plate having a relatively large rigidity, so that when the mounted object stands still, the weight of the mounted object is supported as an initial vertical load via the support plate. Usage of these hydraulic mounts as the cab mount of a construction machine requires a further increase in the rigidity of the support plate. Specifically, since these hydraulic mounts have a small damping effect on horizontal vibration, the hydraulic mounts cannot prevent the horizontal vibration of the cab, which results in a poor ride quality. Suppression of this vibration requires an increase in the horizontal rigidity. However, such an increase leads to an increase in the vertical rigidity, so that anti-vibration effect is impaired. In order to avoid the increase in the vertical rigidity, there has been suggested a construction machine cab mount that uses, for instance, a rubber support plate to allow the suppression of the horizontal cab vibration and a reduction in the vertical rigidity (improvement in the anti-vibration effect) (e.g. Patent Literature 4).

In contrast, in the hydraulic mount of Patent Literature 1, the horizontal direction of the cab is supported by a rubber having a large rigidity while a vertical load is supported by the vehicle body frame via the relatively-soft spring 95, thereby reducing a vertical static spring constant. Thus, it is possible to prevent a bumpy feeling when a low frequency vibration is input, so that the ride quality is preferable.

CITATION LIST

Patent Literatures

Patent Literature 1: JP-A-2003-113889
Patent Literature 2: JP-A-57-161331
Patent Literature 3: JP-A-4-92139
Patent Literature 4: JP-A-6-257638

SUMMARY OF THE INVENTION

Problems to be Solved by the Invention

Although there are structural differences between Patent Literatures 1 to 4, hydraulic mounts generally have anti-vibration characteristics of exhibiting a larger dynamic spring constant in accordance with a rise in the frequency of input vibration, and thus, cannot offer a preferable ride quality over a wide frequency band. In other words, a rise in the dynamic spring constant relative to the static spring constant cannot be reduced, so that a bumpy feeling is given and the ride quality is impaired in a high frequency band.

Particularly when the hydraulic mount of Patent Literature 2 or 3 is applied to a construction machine as described above, the static spring constant in a low frequency band becomes large as compared with that of the hydraulic mount of Patent Literature 1 due to the increased rigidity of the support plate. As a result, in a high frequency band, a rise in the dynamic spring constant is added to a considerably larger static spring constant than that of the hydraulic mount of Patent Literature 1, so that the dynamic spring constant becomes large, and thus, the ride quality is further impaired.

In the hydraulic mount of Patent Literature 4, the vertical rigidity is lowered but still not so small as that in Patent Literature 1.

Incidentally, in order to reduce the dynamic spring constant of the hydraulic mount, for instance, in Patent Literature 1, reducing the viscosity of the fluid is effective. However, when the viscosity of the fluid is simply reduced, a loss damping coefficient in the low frequency band becomes excessively small, so that low frequency vibration cannot be damped and the ride quality of the cab is impaired.

In view of the above, in order to improve the ride quality over a wide frequency band, it is desired to obtain a damping coefficient identical to that obtained using a high-viscosity fluid while lowering the dynamic spring constant even in a high frequency band.

An object of the invention is to provide a hydraulic mount that is capable of exhibiting preferable anti-vibration characteristics to input vibrations in a wide range from a low frequency band to a high frequency band.

Means for Solving the Problems

In the hydraulic mount, the advancement and retraction of the rod and the fluid resistance of the high-viscosity fluid generate a reaction force. When an external force is transmitted from the vehicle body frame, air can be mixed in the high-viscosity fluid, and when the inner pressure is lowered, a response delay occurs in the generation of the reaction force relative to the input vibration velocity. In a normal situation without any response delay, the reaction force generated by the fluid resistance is only a damping force that depends on the input vibration velocity, as shown by the following expression (1). The following expression (2) shows the input vibration velocity and the following expression (3) shows a damping coefficient as a constant. In contrast, when a response delay occurs in the reaction force, a phase delay θ of the reaction force is caused. As a result, as shown by the following expression (4), a damping force as a reaction force that depends on the input vibration velocity and a dynamic spring force as a reaction force that depends on the input vibration displacement are generated. In other words, the whole reaction force relative to the vibration is the sum of the damping force and the dynamic spring force, so that a so-called dynamic spring force, which acts as a spring force only at the time of a dynamic movement, is generated. The input vibration displacement is shown by the following expression (5). Since the dynamic spring force is a product of the dynamic spring constant and the displacement, the dynamic spring constant is shown by the following expression (6).

Formula 1
[Reaction Force without Response Delay]

$$\text{Reaction Force: } f(t) = \text{Damping Force: } f_0 \cos(\omega t) = \text{Damping Coefficient: } (f_0/\dot{x}_0) \cdot \text{Velocity: } \dot{x}(t) \quad (1)$$

$$\text{Velocity: } \dot{x}(t) = \dot{x}_0 \cos(\omega t) \quad (2)$$

$$\text{Damping Coefficient: } (f_0/\dot{x}_0) \quad (3)$$

Note that ω: excitation angular frequency and t: time.
[Reaction Force with Response Delay]

$$\text{Reaction Force: } f(t) = f_0 \cos(\omega t - \theta) = \text{Damping Force: } (f_0 \cos\theta)\cos\omega t + \text{Dynamic Spring Force: } (f_0 \sin\theta)\sin\omega t \quad (4)$$

$$\text{Displacement: } x(t) = (\dot{x}_0/\omega)\sin\omega t \quad (5)$$

$$\text{Dynamic Spring Constant: } (f_0/\dot{x}_0)\omega \sin\theta \quad (6)$$

Note that θ: phase delay resulting from response delay.

The above expression (6) shows that the dynamic spring constant is a function of the phase delay θ and the excitation angular frequency ω. Specifically, while being increased depending on the phase delay, the dynamic spring constant becomes larger as the excitation angular frequency ω becomes higher. As a result, resonance frequency becomes higher than the designed anti-vibration characteristics and the damping force falls, so that the cab vibration becomes larger in a low frequency band. In view of the above, in order to suppress an increase in the dynamic spring constant in a high frequency band for improvement in the ride quality, it is important to further smoothly generate a damping force by preventing air from being mixed in the high-viscosity fluid and by providing a pressurizer or the like to prevent a response delay.

For achieving the above object in view of the above, according to an aspect of the invention, a hydraulic mount includes: a container in which a high-viscosity fluid is sealed; a rubber mount that is provided on an upper side of the container; a rod that is reciprocatively movable relative to the high-viscosity fluid in the container and penetrates through the rubber mount; a damper plate that is integrally provided to an end of the rod and is located in the high-viscosity fluid; a damping force generator that is provided by a clearance between an inner circumference of the container and an outer circumference of the damper plate; a main fluid chamber that includes an upper fluid chamber and a lower fluid chamber provided by vertically dividing an interior of the container by the damper plate; and a pressurizer that pressurizes the sealed high-viscosity fluid during an axial movement of the rod, in which the high-viscosity fluid is liquid-tightly sealed in the container.

With the above arrangement, the high-viscosity fluid is sealed in the container. Thus, air in the form of bubbles cannot be mixed in the high-viscosity fluid, so that a reaction force can be generated with an improved responsiveness relative to the input vibration velocity. Further, when the damper plate moves downward in the high-viscosity fluid along with the rod, a damping force is generated by the damping force generator provided by the clearance between the inner circumference of the container and the outer circumference of the damper plate. Simultaneously, the high-viscosity fluid is pressurized by the pressuring unit to stimulate the flow of the high-viscosity fluid from the lower fluid chamber to the upper fluid chamber that are divided by the damper plate. Thus, the damping force can be instantly generated by the damping force generator located in the middle of the flow path, thereby further reliably preventing a response delay.

In the above arrangement, since the responsiveness is improved, substantially only the damping force is generated in response to input vibration, and thus, no dynamic spring force is generated. As a result, the dynamic spring constant can be reduced over a range from a low frequency band to a high frequency band, so that the anti-vibration characteristics can be significantly improved, thereby achieving an object of the invention.

Preferably, the hydraulic mount further includes: a secondary fluid chamber that communicates with the main fluid chamber and has a variable volume, in which the pressurizer includes an orifice that defines a communicating portion between the main fluid chamber and the secondary fluid chamber.

With the above arrangement, the pressurizer is provided by the orifice. Thus, when the rod moves downward, the high-viscosity fluid passes through the orifice, and the resulting fluid resistance of the high-viscosity fluid serves to reliably increase the inner pressure of the lower fluid chamber. Thus, a differential pressure can be reliably generated between the lower fluid chamber and the upper fluid chamber with a simple structure. On the other hand, when the rod moves upward after moving downward, the high-viscosity fluid having flowed into the upper fluid chamber is forced to return to the lower fluid chamber through the clearance. Thus, when the fluid is allowed to reliably flow into the upper fluid chamber during the downward movement of the rod, a differential pressure can also be reliably generated during the upward movement of the rod.

Incidentally, while the volume of the main fluid chamber is reduced during the downward movement of the rod, the volume of the secondary fluid chamber is increased by an amount corresponding to the reduced amount.

In the hydraulic mount, it is preferable that the communicating portion be provided with a valve that allows a flow of the high-viscosity fluid from the secondary fluid chamber to the main fluid chamber but not a flow of the high-viscosity fluid from the main fluid chamber to the secondary fluid chamber.

With the above arrangement, for instance, a check valve is provided to the communicating portion between the main fluid chamber and the secondary fluid chamber. Thus, the high-viscosity fluid flows from the main fluid chamber into the secondary only through the orifice, thereby reliably generating a differential pressure. Further, the hydraulic fluid returns from the secondary fluid chamber into the main fluid chamber through both the orifice and the check valve, thereby reliably preventing generation of negative pressure in the main fluid chamber. On the other hand, the opening area of the orifice can be reduced by an amount corresponding to the check valve, thereby further reliably generating a differential pressure. Thus, even in the case where a larger differential pressure is required, the arrangement is preferably applicable.

In the hydraulic mount, it is preferable that the pressurizer allow pressurization equal to or above a differential pressure caused between the upper fluid chamber and the lower fluid chamber.

With the above arrangement, the pressurizer allows pressurization equal to or above a differential pressure caused between the upper fluid chamber and the lower fluid chamber. Thus, when the rod moves in response to input vibration, the high-viscosity fluid can smoothly flow from the lower fluid chamber into the upper fluid chamber, so that a damping force can be reliably generated by the damping force generator located in the middle of the flow path.

When the rod returns, the pressurization of the pressurizer prevents generation of negative pressure in the main fluid chamber, so that the high-viscosity fluid can reliably return from the secondary fluid chamber into the main fluid chamber.

In the hydraulic mount, it is preferable that the pressurizer include a free piston that is movable in conjunction with a flow of the high-viscosity fluid from the main fluid chamber.

In the hydraulic mount, it is preferable that the pressurizer include a coil spring, an air chamber or a gas chamber that biases the free piston.

With the above arrangements, the pressurizer can be easily provided by the coil spring, the air chamber or the gas chamber and the free piston biased thereby. In addition, since the free piston is movable by the flow of the high-viscosity fluid from the main fluid chamber, the whole of the main fluid chamber and the secondary fluid chamber can be preferably pressurized, thereby reliably generating a differential pressure between the upper fluid chamber and the lower fluid chamber.

In the hydraulic mount, it is preferable that the pressurizer include a movable film that is movable in conjunction with a flow of the high-viscosity fluid from the main fluid chamber.

In the hydraulic mount, it is preferable that the pressurizer include an air chamber or a gas chamber that biases the movable film.

With the above arrangements, the movable film, which is biased by the air chamber or the gas chamber, serves to accept a volume change resulting from the movement of the rod.

In this aspect, the rubber film is provided by an elastically-deformable rubber film, a film-like synthetic resin film, or the like.

Preferably, the hydraulic mount further includes: a spring that is interposed between the damper plate and a bottom of the container, in which the rod slidably penetrates through the rubber mount.

With the above arrangement, the weight of a heavy mounted-object such as a cab is supported via a spring in the initial state. Thus, the static spring constant can be significantly reduced, and consequently, the dynamic constant can also be reduced, thereby further improving the anti-vibration characteristics.

According to another aspect of the invention, a hydraulic mount includes: a container in which a high-viscosity fluid is sealed; a rubber mount that is provided on an upper side of the container; a rod that is reciprocatively movable relative to the high-viscosity fluid in the container and slidably penetrates through the rubber mount; a damper plate that is integrally provided to an end of the rod and is located in the high-viscosity fluid; a spring that is interposed between the damper plate and a bottom of the container; a damping force generator that is provided by a clearance between an inner circumference of the container and an outer circumference of the damper plate; a main fluid chamber that includes an upper fluid chamber and a lower fluid chamber provided by vertically dividing an interior of the container by the damper plate; a secondary fluid chamber that communicates with the main fluid chamber and has a movable film that is movable in accordance with an inflow amount of the high-viscosity fluid to change a volume of the secondary fluid chamber; an air chamber or a gas chamber that biases the movable film; and an orifice that defines a communicating portion between the main fluid chamber and the secondary fluid chamber, in which the high-viscosity fluid is liquid-tightly sealed in the container.

With the above arrangement, since the above elements of the hydraulic mount are provided all together, it is possible to realize a hydraulic mount having superior anti-vibration characteristics as compared with one for achieving the object of the invention.

DESCRIPTION OF THE EXEMPLARY EMBODIMENT(S)

Figure 17:
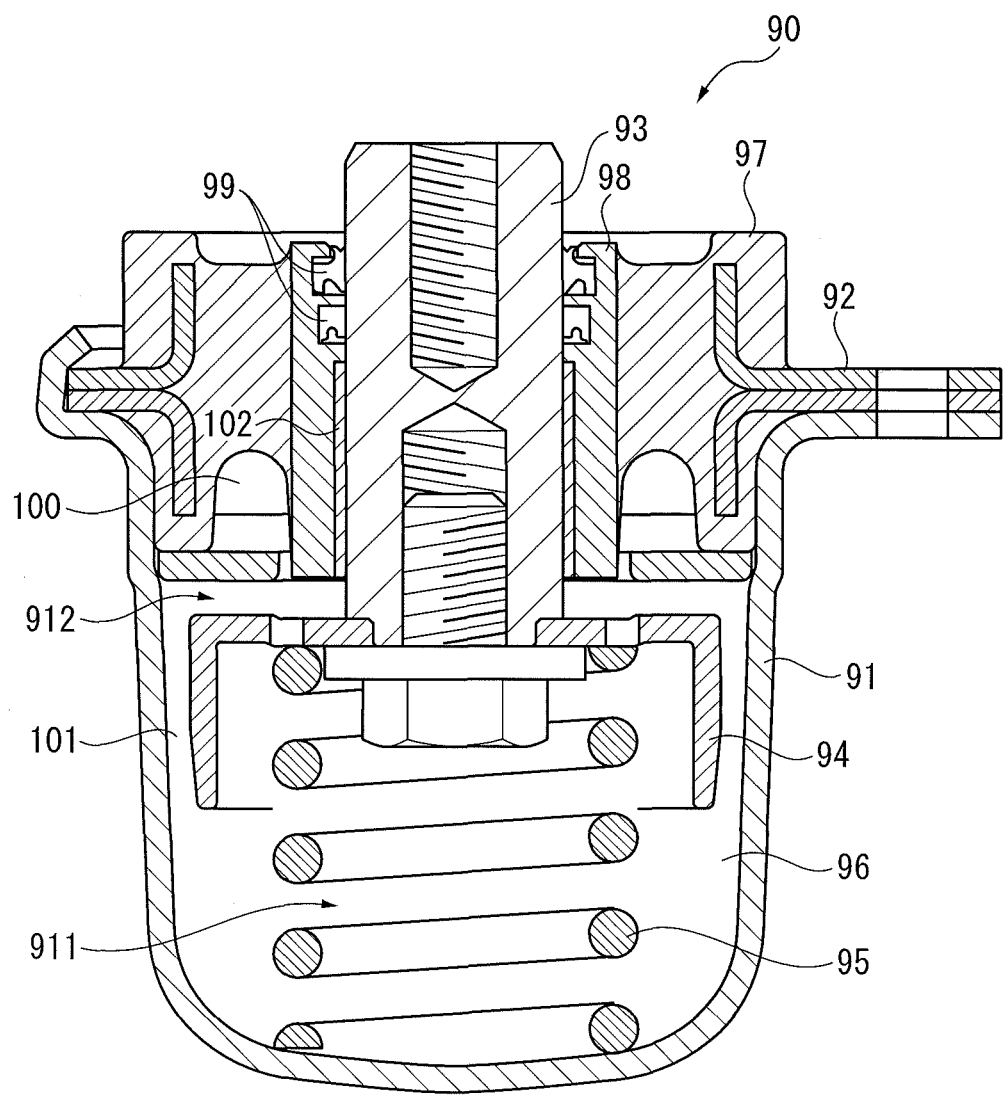
FIG. 17 is a cross sectional view showing a conventional hydraulic mount.

Exemplary embodiment(s) of the invention will be described below with reference to the attached drawings. In the description of each exemplary embodiment, the same reference numeral will be used to denote a component identical to or similar in function to that of the conventional hydraulic mount 90 described with reference to FIG. 17 so as to omit or simplify an explanation thereof in the exemplary embodiment. When a component that has already been explained in one exemplary embodiment is likewise used in another exemplary embodiment, an explanation thereof will also be omitted or simplified.

First Exemplary Embodiment

Figure 1:
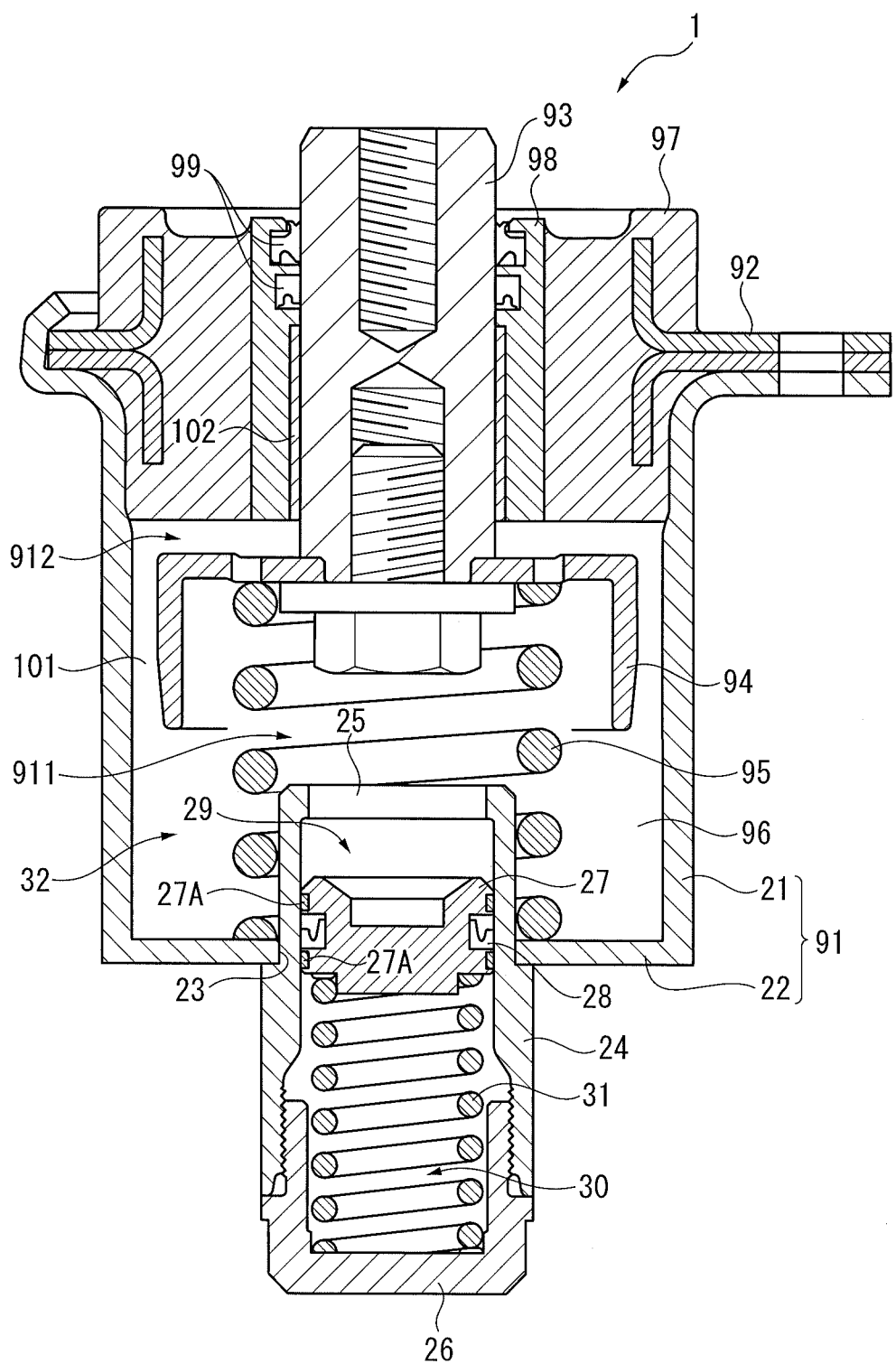
FIG. 1 is a cross sectional view showing a hydraulic mount according to a first exemplary embodiment of the invention.

FIG. 1 shows a hydraulic mount 1 according to a first exemplary embodiment of the invention. In the hydraulic mount 1, a container 91 includes a cylindrical container body 21 and a disk-shaped bottom 22. The container body 21 and the bottom 22 are joined to each other.

A through hole 23 vertically penetrates the center of the bottom 22. A cylindrical cylinder 24 is coupled to the through hole 23. The upper side of the cylinder 24 is inserted in the container 91 and an opening 25 formed in the upper end of the cylinder 24 opens in a lower fluid chamber 911 defined in the container 91. The inserted portion of the cylinder 24 in the container 91 also functions as a part of a receiving potion for a spring 95.

The lower side of the cylinder 24 is closed by a cap 26 that is threadedly connected via a seal ring (not shown). A vertically slidable free piston 27 is located in the cylinder 24. A pair of bearings 27A and a seal ring 28 are attached to the free piston 27 to seal a space between the respective sliding surfaces of the free piston 27 and the cylinder 24, while allowing a vertical slide motion of the free piston 27.

In the cylinder 24, a volume-variable secondary fluid chamber 29 of the hydraulic mount 1 is defined at the upper side of the free piston 27 and an air chamber 30 is defined at the lower side of the free piston 27. In the air chamber 30, a coil spring 31 having a predetermined spring constant is located, so that the free piston 27 is biased upward by the coil spring 31. FIG. 1 shows the initial state of the free piston 27 where no vibration is input. In this state, the free piston 27 is balanced below the opening 25 while a predetermined amount of a high-viscosity fluid 96 is present in the secondary fluid chamber 29.

Incidentally, the lower fluid chamber 911 and an upper fluid chamber 912 form a main fluid chamber 32 of the hydraulic mount 1. The main fluid chamber 32 and the secondary fluid chamber 29 of the cylinder 24 communicate with each other. Thus, since the free piston 27 is biased by the coil spring 31, the high-viscosity fluid 96 in the secondary fluid chamber 29 and the main fluid chamber 32 are beforehand pressurized to a differential pressure required to generate a necessary damping force (i.e., necessary differential pressure) or higher (i.e., pressurized to several times as large as atmospheric pressure). In other words, in this exemplary embodiment, the coil spring 31 and the free piston 27 form the pressurizer according to the invention.

Unlike a conventional arrangement, no air chamber is provided above the upper fluid chamber 912 of the main fluid chamber 32, so that the whole interior of the main fluid chamber 32 is liquid-tightly filled with the high-viscosity fluid 96. Thus, air is kept from being mixed in the high-viscosity fluid 96 upon the input of vibration to exist therein as air bubbles, thereby suppressing a delay in generation of a reaction force relative to the input vibration velocity.

In the hydraulic mount 1 of this exemplary embodiment, when, for instance, a rod 93 slides downward in response to the input of vertical vibration, the free piston 27 moves downward by an amount corresponding to a reduction in the volume of the main fluid chamber 32 and the volume of the secondary fluid chamber 29 is increased. At this time, since the interior of the main fluid chamber 32 has been pressurized to the necessary differential pressure or higher and no air bubble is generated therein, negative pressure is not generated even when a high frequency vibration is input. Specifically, the inner pressure of the lower fluid chamber 911 can be instantly increased beyond that of the upper fluid chamber 912 to generate a differential pressure, thereby allowing the high-viscosity fluid 96 in the lower fluid chamber 911 to smoothly flow into the upper fluid chamber 912. Thus, the reaction force can be generated without any delay relative to the input vibration velocity.

In the above manner, it is possible to generate only a damping force proportional to an input vibration velocity over a wide vibration frequency band, thereby suppressing an increase in the dynamic spring constant and improving the ride quality.

When the rod 93 moves upward after moving downward, the high-viscosity fluid 96 having flowed in the upper fluid chamber 912 can return to the lower fluid chamber 911 only through a clearance 101. In addition, the high-viscosity fluid 96 in the secondary fluid chamber 29 also returns to the main fluid chamber 32 in conjunction with the upward movement of the rod 93. As a result, a differential pressure is instantly generated, thereby preventing a response delay. Since the biasing force can be changed as desired based on the coil spring 31, this exemplary embodiment is applicable to generate a large necessary differential pressure.

Second Exemplary Embodiment

Figure 2:
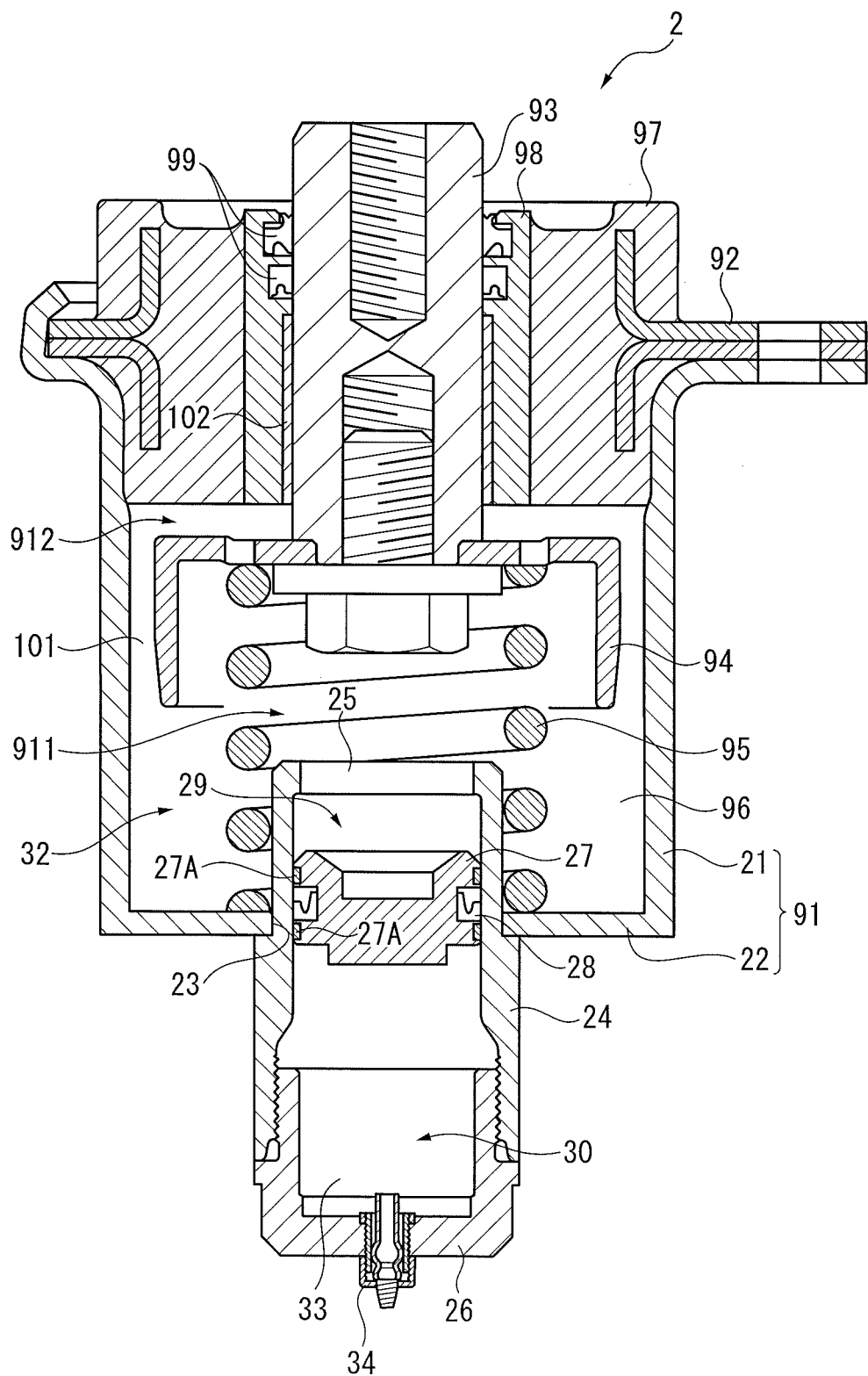
FIG. 2 is a cross sectional view showing a hydraulic mount according to a second exemplary embodiment of the invention.

FIG. 2 shows a hydraulic mount 2 according to a second exemplary embodiment of the invention. The hydraulic mount 2 is provided with a compressed air 33 that is sealed in the air chamber 30 in place of the coil spring 31, and an air valve 34 (English valve type or the like) for injecting the compressed air 33 into the air chamber 30. The free piston 27 and the compressed air 33 form the pressurizer according to the invention. In light of the above arrangement, the second exemplary embodiment is structurally different from the first exemplary embodiment. However, the other arrangements, such as the high-viscosity fluid 96 that is liquid-tightly sealed, are the same as those of the first exemplary embodiment.

The first exemplary embodiment uses the coil spring 31, so that the spring length may be increased so as to increase the biasing force. Such an increase in the spring length may increase the length of the cylinder 24. In contrast, this exemplary embodiment uses the compressed air, so that the biasing force can be increased without increasing the length of the cylinder 24. Thus, a compact structure can be obtained. In view of the above, while being approximately as large as the first exemplary embodiment, this exemplary embodiment is applicable to generate a larger necessary differential pressure.

In the hydraulic mount 2 of this exemplary embodiment, since the free piston 27 is biased upward by the compressed air 33 in the air chamber 30, the high-viscosity fluid 96 in the main fluid chamber 32 can also be pressurized in the same manner as in the first exemplary embodiment. Thus, a differential pressure can be generated between the lower fluid chamber 911 and the upper fluid chamber 912 in conjunction with the movement of the rod 93. Further, since the high-viscosity fluid 96 is liquid-tightly sealed in the container 91, there is no possibility of generation of air bubbles. Thus, since the responsiveness is improved over a wide vibration frequency band in the same manner as in the first exemplary embodiment, it is possible to generate only a damping force proportional to the input vibration velocity, thereby suppressing an increase in the dynamic spring constant and improving the ride quality. Incidentally, though the air chamber 30 that is filled with air is formed in the cylinder 24, a gas chamber that is filled with any gas other than air, such as nitrogen, may be formed.

Third Exemplary Embodiment

Figure 3:
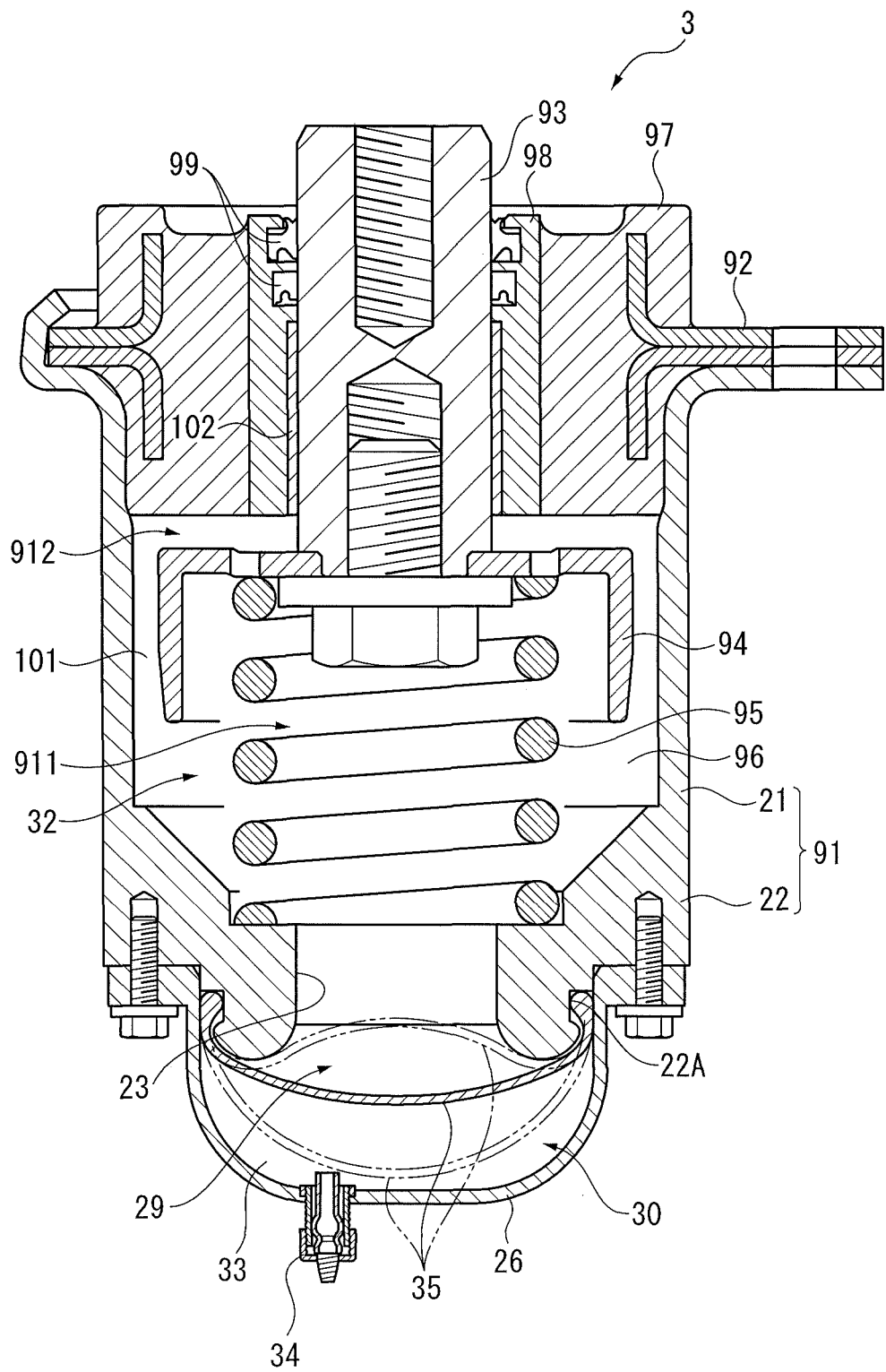
FIG. 3 is a cross sectional view showing a hydraulic mount according to a third exemplary embodiment of the invention.

FIG. 3 shows a hydraulic mount 3 according to a third exemplary embodiment of the invention. In the hydraulic mount 3, a large-diameter through hole 23 formed through the bottom 22 is used as a flow hole for the high-viscosity fluid 96. The secondary fluid chamber 29 below the bottom 22 is formed by a elastically-deformable thin rubber film 35 that closes the through hole 23.

A cap 26 is attached to the lower surface of the bottom 22 using a bolt to cover the rubber film 35 from below. The circumference of the rubber film 35 is inserted in a groove 22A formed in the bottom 22 to be held between the bottom 22 and the cap 26. The circumference of the rubber film 35 is an oil seal, so that the high-viscosity fluid 96 in the secondary fluid chamber 29 is kept from leaking. The upper side of the inner space of the cap 26 is covered by the rubber film 35 to function as the air chamber 30 into which the compressed air 33 is injected from the air valve 34.

In this exemplary embodiment, since the rubber film 35, which is used in place of the free piston 27 of the first and second exemplary embodiments, has a small thickness such as approximately a few mm and exhibits a small elasticity, the rubber film 35 needs to be pressurized with a compressed air. This is why the compressed air 33 similar to that of the second exemplary embodiment is injected in the air chamber 30. In this exemplary embodiment, the compressed air 33 and the rubber film 35 form the pressurizer according to the invention. Incidentally, the cap 26 also functions as a cover that protects the rubber film 35

In the first and second exemplary embodiments, for instance, when the biasing force for pressing the free piston 27 is small, sliding resistance between the free piston 27 and the cylinder 24 may interrupt the movement of the free piston 27. In contrast, in this exemplary embodiment, since the rubber film 35 has no slidable portion and thus is always preferably movable, a small biasing force is sufficient to generate a small necessary differential pressure. In other words, this exemplary embodiment is applicable over a wide range from a small differential pressure to a large differential pressure.

In this exemplary embodiment, when the rod 93 slides downward, the high-viscosity fluid 96 of an amount corresponding to a reduction in the volume of the main fluid chamber 32 flows downward through the through hole 23. As a result, the rubber film 35 bulges downward to deform, and thus, the volume of the secondary fluid chamber 29 is increased.

The high-viscosity fluid 96 in the main fluid chamber 32 has been considerably pressurized by the compressed air 33 while generation of air bubbles is reliably suppressed in the liquid-tight state, so that the responsiveness can be improved even to vibration input in a high frequency band in this exemplary embodiment in the same manner as in the first and second exemplary embodiments. Thus, an increase in the dynamic spring constant is suppressed, thereby improving the ride quality. Incidentally, the air chamber 30 in the cap 26 may be replaced by a gas chamber that is filled with any gas such as nitrogen.

Fourth Exemplary Embodiment

Figure 4:
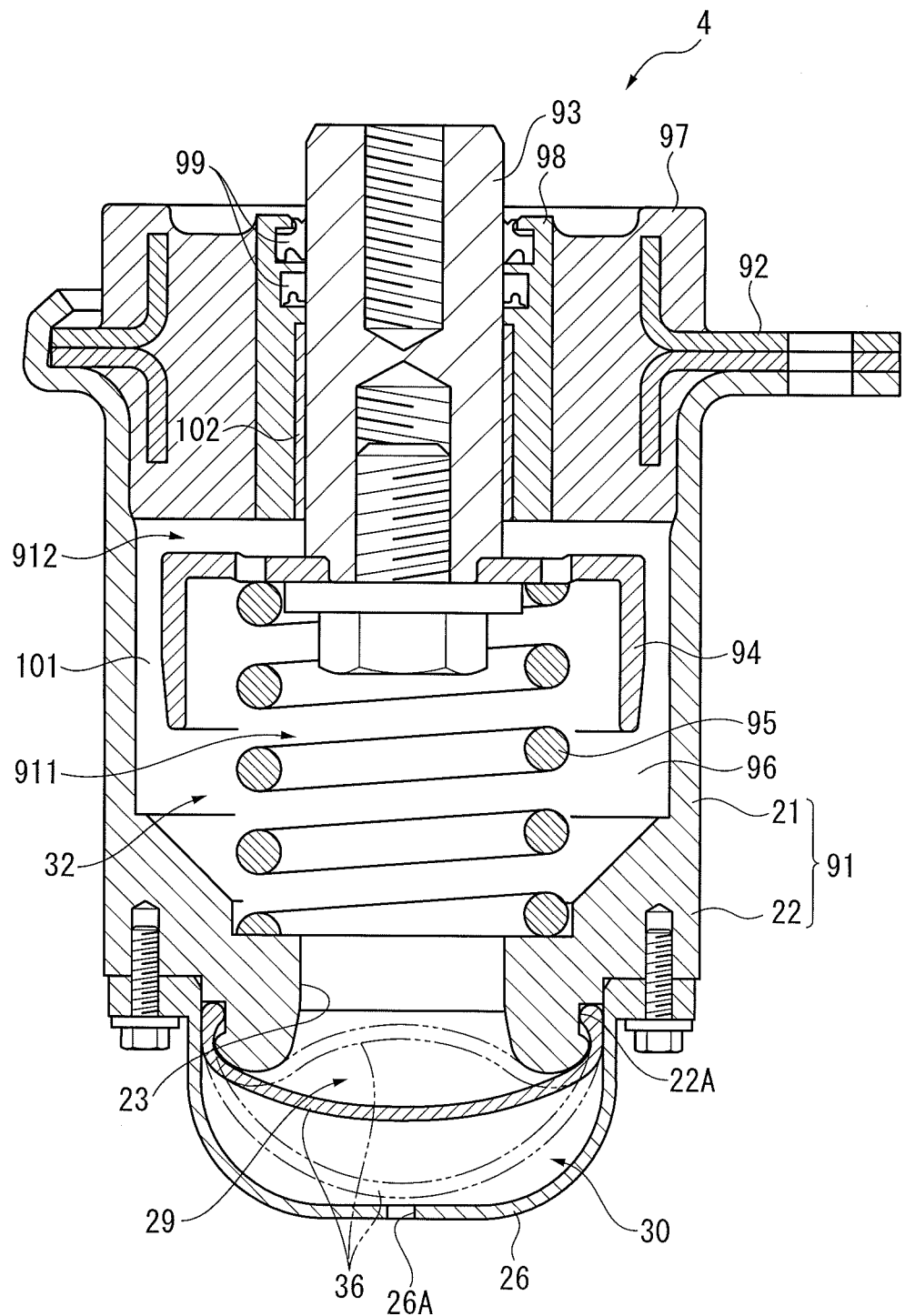
FIG. 4 is a cross sectional view showing a hydraulic mount according to a fourth exemplary embodiment of the invention.

FIG. 4 shows a hydraulic mount 4 according to a fourth exemplary embodiment of the invention. In the hydraulic mount 4, the thin rubber film 35 of the third exemplary embodiment is replaced by a thick rubber film 36 having a large elasticity. Though the pressure inside the main fluid chamber 32 is atmospheric pressure while the rod 93 is unpressed, when the rod 93 is set at a neutral position or slides in a shrinking direction, the elasticity of the rubber film 36 serves to pressurize the interior of the main fluid chamber 32 to or above the necessary differential pressure (i.e., several times as large as atmospheric pressure). In view of the above, in this exemplary embodiment, while no compressed air for pressurization is injected in the air chamber 30, the cap 26 is provided with an orifice 26A as an air vent through which uncompressed air flows. In other words, since the elasticity of the rubber film 36 is larger than that of the rubber film 35, the rubber film 36 can sufficiently function by itself as the pressurizer according to the invention. The other arrangements are substantially the same as those of the third exemplary embodiment.

In this exemplary embodiment, the high-viscosity fluid 96 is also liquid-tightly sealed and the interior of the main fluid chamber 32 is pressurized by the rubber film 36, thereby obtaining the same effects as those in the first to third exemplary embodiments to achieve an object of the invention.

Fifth Exemplary Embodiment

Figure 5:
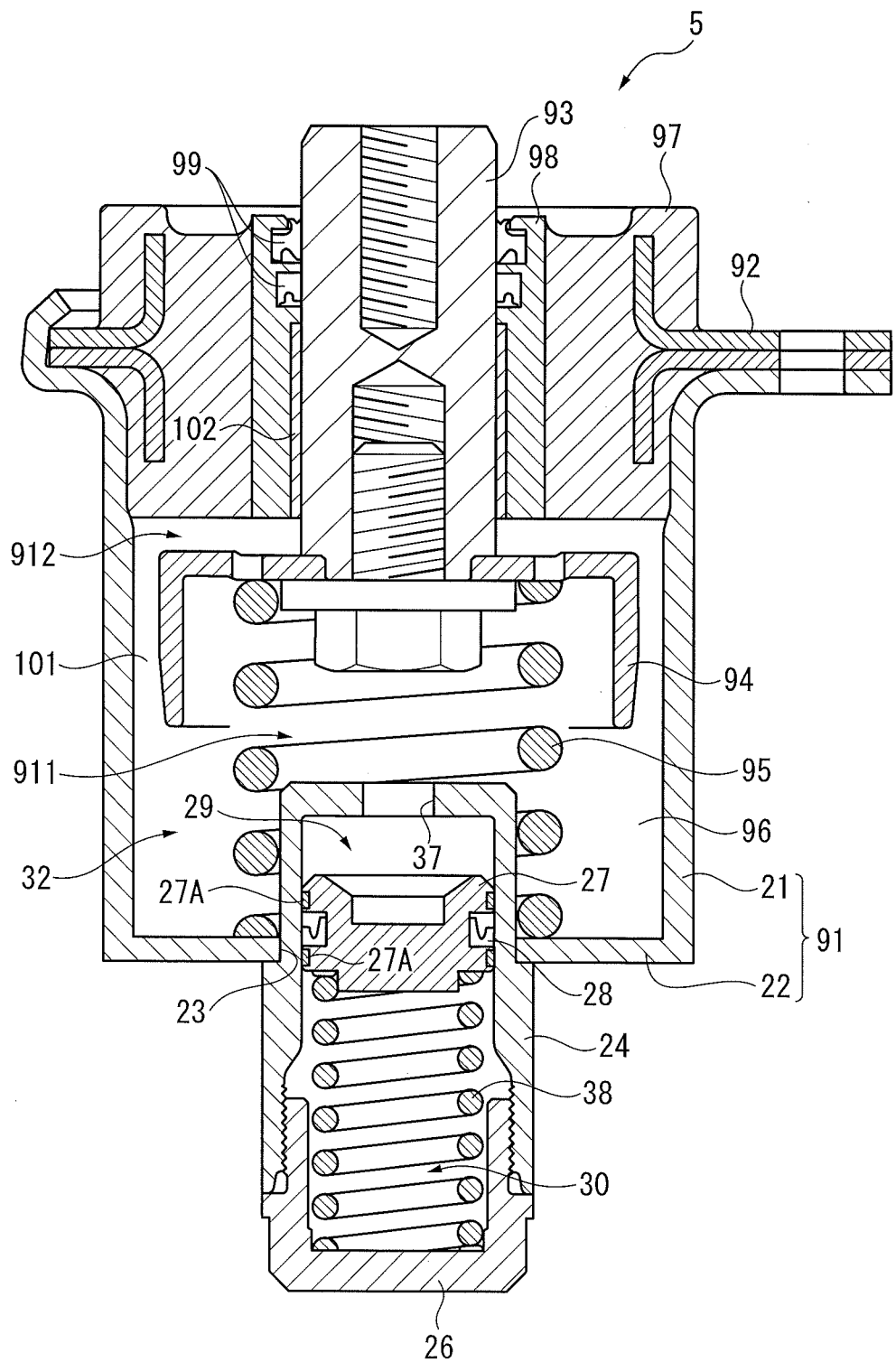
FIG. 5 is a cross sectional view showing a hydraulic mount according to a fifth exemplary embodiment of the invention.

FIG. 5 shows a hydraulic mount 5 according to a fifth exemplary embodiment of the invention. In the hydraulic mount 5, an opening having a smaller diameter than that of the opening 25 of the first exemplary embodiment, i.e., a fixed orifice 37, is provided at the upper end of the cylinder 24 and a coil spring 38 is housed in the air chamber 30. The spring constant, for instance, of the coil spring 38 is set smaller than that of the coil spring 31 of the first exemplary embodiment to reduce the biasing force. The other arrangements are the same as those of the first exemplary embodiment. Specifically, the coil spring 38 accessorily biases the free piston 27 upward and thus, does not pressurize the interior of the main fluid chamber 32 as much as in the first exemplary embodiment.

The orifice 37 of this exemplary embodiment is provided to maintain the inner pressure so as to prevent generation of negative pressure inside the lower fluid chamber 911 and the upper fluid chamber 912 even when the biasing force to the free piston 27 is smaller than in the first exemplary embodiment. Thus, the orifice 37 does not function as the damping force generator as the orifice of Patent Literature 2. With the above arrangement, a damping force generated by the orifice 37, which is approximately 10% of the damping force generated by the clearance 101, is so small as to be negligible. The same applies to the orifice 37 used in any of the following exemplary embodiments.

Figure 12:
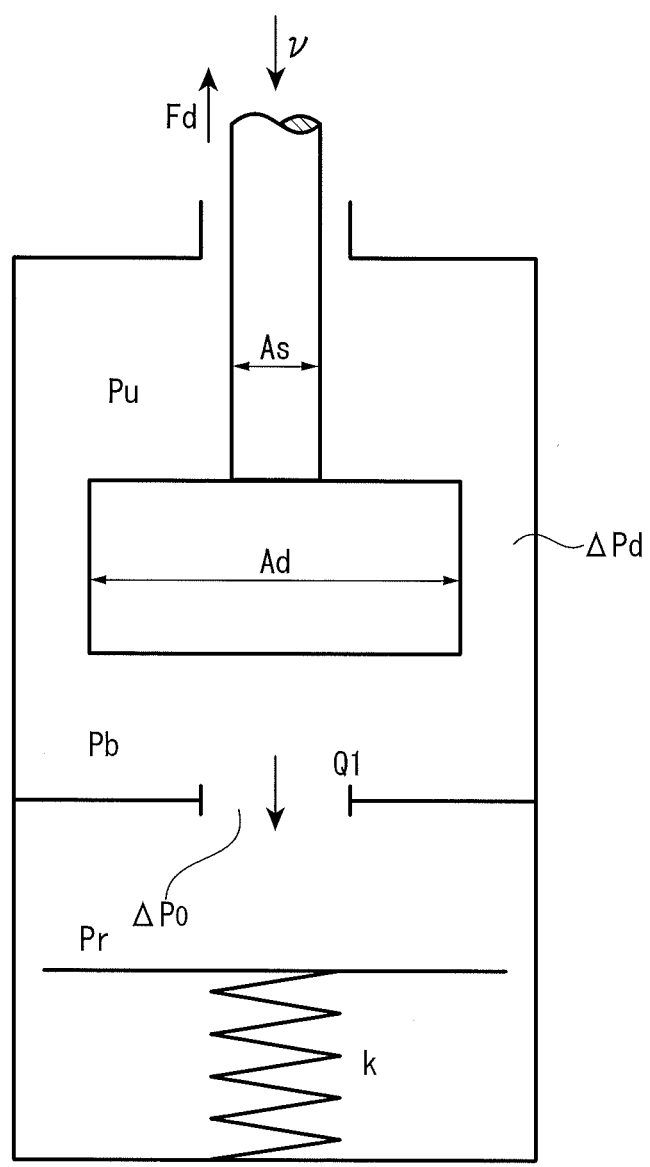
FIG. 12 is a diagram for illustrating how to decide the shape of an orifice used in the invention.

Referring to the diagram of FIG. 12, the diameter of the orifice 37 can be determined as follows. In FIG. 12, the reference numerals of the elements are omitted.

The diameter of the orifice 37 is determined in such a manner as not to generate negative pressure in the lower fluid chamber 911 and the upper fluid chamber 912. The initial values of a spring constant K and the like of the coil spring 38 are known.

What is first determined is a damping force Fd required when the rod 93 is pressed in, so that negative pressure can be easily generated inside the upper fluid chamber 912. When the damping force Fd is determined, a differential pressure $\Delta Pd$ can be obtained by the following expression. In the expression, Ad denotes the radial cross-sectional area of the damper plate 94.

$Fd=\Delta Pd \times Ad$ $\Delta Pd=Fd/Ad$

Since the differential pressure $\Delta Pd$ is a difference between an inner pressure Pb of the lower fluid chamber 911 and an inner pressure Pu of the upper fluid chamber 912, the following expression is derived.

$Pb-Pu=\Delta Pd$ $Pu=Pb-\Delta Pd$

A relationship of a differential pressure $\Delta Po$ of the orifice 37 to the inner pressure Pb of the lower fluid chamber 911 and an inner pressure Pr of the secondary fluid chamber 29 is shown as follows. The inner pressure Pr can be obtained based on the volume inflow amount of the rod 93, the initial values of the coil spring 38, and the radial cross-sectional area of the free piston 27. The volume inflow amount means the volume of an inserted portion of the rod 93 when the rod 93 is inserted into the main fluid chamber.

$\Delta Po=Pb-Pr$ $Pb=\Delta Po+Pr$

Thus, the following expression is derived.

$Pu=\Delta Po+Pr-\Delta Pd$

To make the inner pressure Pu of the upper fluid chamber 912 positive, the following expression needs to be satisfied.

$\Delta Po-\Delta Pd+Pr>0$

In this expression, the $\Delta Pd$ and Pr are known as described above, and the $\Delta Po$ is a function of the physical properties of the high-viscosity fluid 96, an orifice-passed flow rate Q1 determined by the volume inflow amount of the rod 93, and the shape of the orifice 37. Thus, an orifice diameter can be determined by determining the oil physical properties and the orifice-passed flow rate Q1. Incidentally, $Q1=As \times v$, where As denotes the radial cross-sectional area of the rod 93, and v denotes the speed of the rod 93.

Next, consideration is made on the case where the rod 93 is pulled out, so that negative pressure can be easily generated inside the lower fluid chamber 911. In this case, the differential pressure ΔPo of the orifice 37 is obtained by the following expression opposite to the above one.

$$\Delta Po = Pr - Pb$$

$$Pb = Pr - \Delta Po$$

To make the inner pressure Pr of the lower fluid chamber 911 positive, the following expression needs to be satisfied.

$$Pr - \Delta Po > 0$$

Based on this expression, an orifice diameter can be determined by determining the physical properties of the high-viscosity fluid 96 and the orifice-passed inflow flow rate Q1 in the same manner as described above.

In view of the above, the diameter of the orifice 37 may be determined in a range from a diameter large enough to prevent generation of negative pressure inside the lower fluid chamber 911 upon the upward movement of the rod 93 to a diameter small enough to prevent generation of negative pressure inside the upper fluid chamber 912 upon the downward movement of the rod 93. When a diameter that fulfills such a condition cannot be determined, the initial values of the coil spring 38 are altered and the same processes are repeated again to determine the diameter.

Incidentally, the above differential pressure ΔPd is a function of the physical properties of the high-viscosity fluid 96, the shape of the damper plate 94, the shape of the clearance between the damper plate 94 and the container body 21, and the speed v of the rod 93, so that these values can be determined when the differential pressure ΔPd is determined.

According to this exemplary embodiment, even though the interior of the main fluid chamber 32 is not so pressurized as in the first exemplary embodiment, when the high-viscosity fluid 96 in the main fluid chamber 32 flows into the secondary fluid chamber 29 in conjunction with the downward movement of the rod 93, the fluid resistance at the orifice 37 reliably increases the pressure inside the main fluid chamber 32, particularly, inside the lower fluid chamber 911, to or above the differential pressure generated as described above.

Such a pressure increase causes the differential pressure between the lower fluid chamber 911 and the upper fluid chamber 912 in the main fluid chamber 32, so that the high-viscosity fluid 96 can flow through the clearance 101 with a high responsiveness to prevent generation of negative pressure inside the upper fluid chamber 912. With the assistance of the liquid-tight state described above, the prevention of negative pressure serves to reduce the dynamic spring constant in a high frequency band, thereby improving vibration characteristics to achieve an object of the invention.

When the rod 93 returns upward, the high-viscosity fluid having flowed in the upper fluid chamber 912 returns to the lower fluid chamber 911. Simultaneously, the high-viscosity fluid 96 in the secondary fluid chamber 29 also returns to the main fluid chamber 32, so that the volume of the secondary fluid chamber 29 is reduced.

At this time, the high-viscosity fluid 96 in the secondary fluid chamber 29 returns to the main fluid chamber 32 through the orifice 37. In this exemplary embodiment, the secondary fluid chamber 29 is accessorily pressurized by the coil spring 38. Thus, as long as such a pressurizing force and the shape (e.g., diameter and length) of the orifice 37 are determined as described above, the high-viscosity fluid 96 can be forced to smoothly flow toward the main fluid chamber 32, so that negative pressure is not generated inside the main fluid chamber 32, thereby preventing the responsiveness from being impaired. Specifically, the free piston 27 and the coil spring 38 form the auxiliary pressurizer according to the invention.

Sixth Exemplary Embodiment

Figure 6:
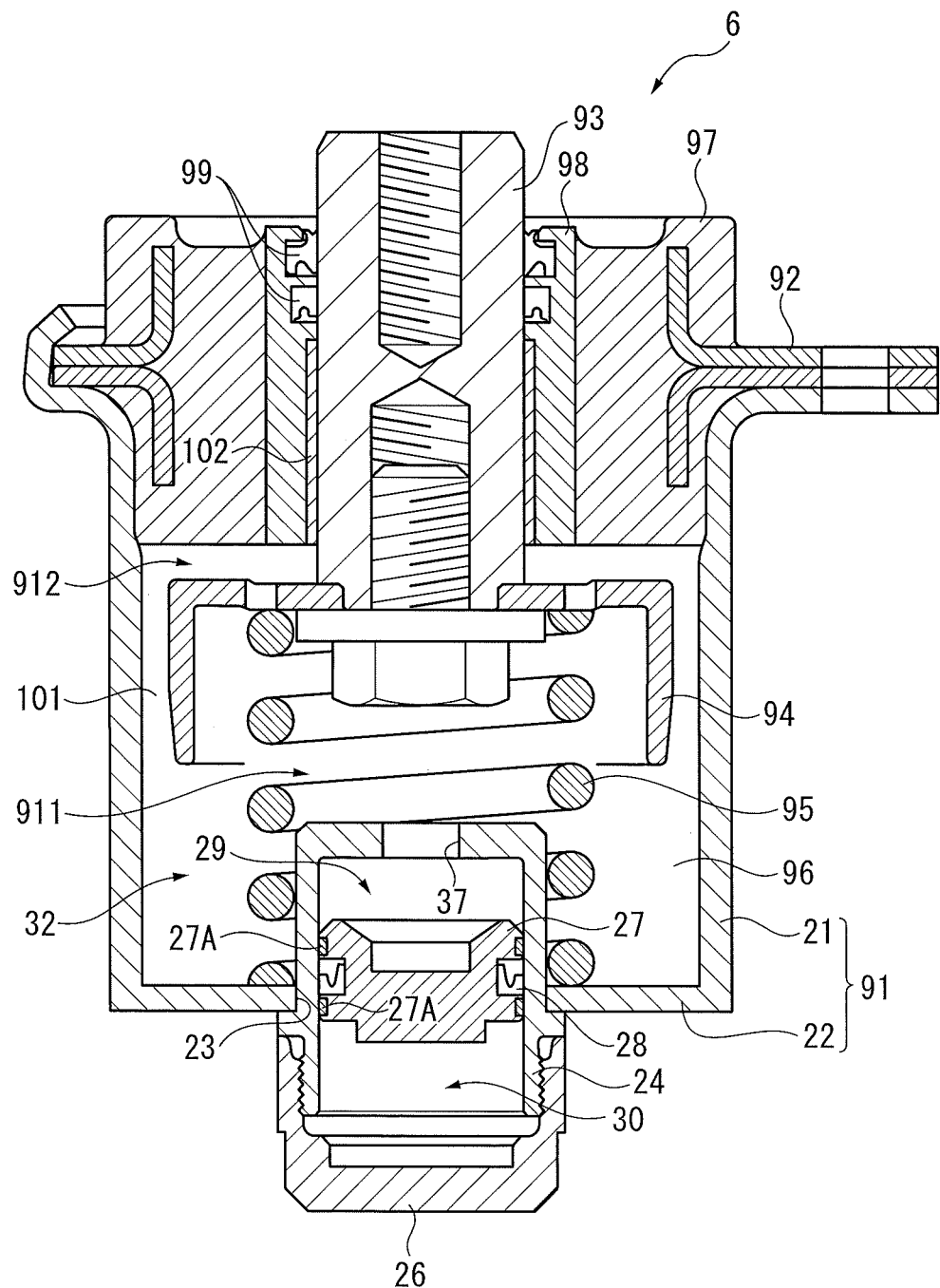
FIG. 6 is a cross sectional view showing a hydraulic mount according to a sixth exemplary embodiment of the invention.

In a hydraulic mount 6 according to a sixth exemplary embodiment shown in FIG. 6, the coil spring 38 is not housed in the air chamber 30, but only air of substantial atmospheric pressure when the rod 93 is set at the uppermost position in the Figure is sealed in the air chamber 30. The other arrangements (e.g., the orifice 37) are the same as those of the fifth exemplary embodiment.

Even in the hydraulic mount 6, since the pressure inside the lower fluid chamber 911 is increased mainly by the effect of the orifice 37, the differential pressure can be generated between the lower fluid chamber 911 and the upper fluid chamber 912. Thus, the responsiveness to the input of vibration is improved to reduce the dynamic spring constant, thereby achieving a preferable ride quality over a wide frequency band.

When the free piston 27 moves downward, the high-viscosity fluid 96 flows into the secondary fluid chamber 29 to compress the air in the air chamber 30, and the resulting reaction force accessorily pressurizes the interior of the secondary fluid chamber 29. Thus, when the rod 93 returns upward, the high-viscosity fluid 96 in the secondary fluid chamber 29 can be forced to smoothly flow into the main fluid chamber 32, thereby preventing generation of negative pressure in the main fluid chamber 32. In other words, in this exemplary embodiment, the free piston 27 and the air sealed in the air chamber 30 form the auxiliary pressurizer according to the invention. This exemplary embodiment is applicable to generate a necessary differential pressure approximately equal to atmospheric pressure.

Seventh Exemplary Embodiment

Figure 7:
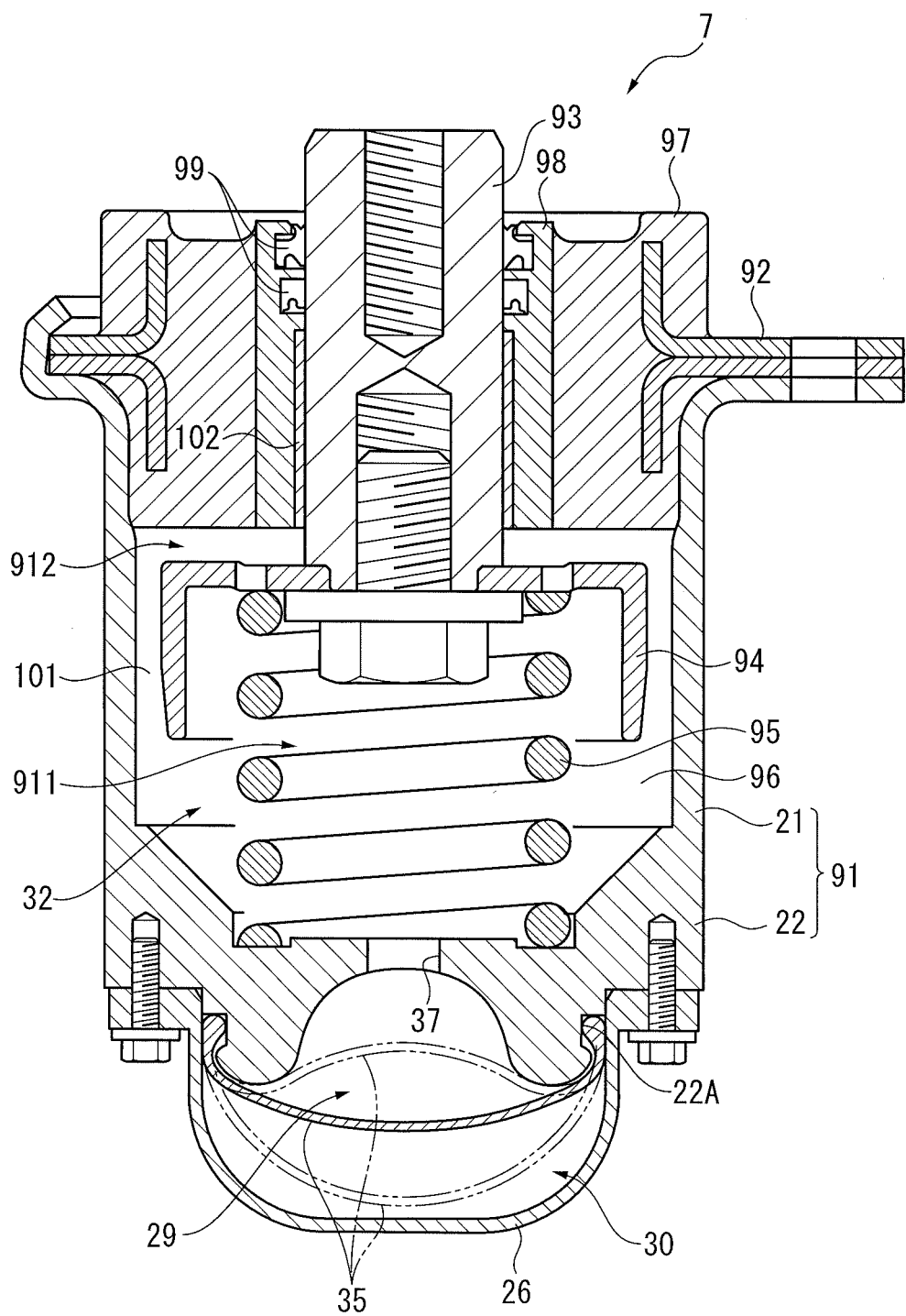
FIG. 7 is a cross sectional view showing a hydraulic mount according to a seventh exemplary embodiment of the invention.

In a hydraulic mount 7 according to a seventh exemplary embodiment shown in FIG. 7, the free piston 27 of the sixth exemplary embodiment is replaced by the thin rubber film 35. However, in the same manner as in the sixth exemplary embodiment, the bottom 22 is provided with the orifice 37, and air of substantially atmospheric pressure is sealed in the air chamber 30 when the rod 93 is set at the uppermost position.

Even in the hydraulic mount 7, the high-viscosity fluid 96 exhibits fluid resistance at the orifice 37 when flowing between the main fluid chamber 32 and the secondary fluid chamber 29 in conjunction with the movement of the rod 93, so that a differential pressure is generated between the lower fluid chamber 911 and the upper fluid chamber 912, thereby obtaining the same effects as those in the sixth exemplary embodiment. This exemplary embodiment is also effective in the case where the necessary differential pressure is approximately equal to atmospheric pressure.

Further, the secondary fluid chamber 29 is accessorily pressurized by the shrinkage pressure of the air in the air chamber 30 (i.e., a reaction force resulting therefrom), so that when the rod 93 returns upward, the high-viscosity fluid 96 can smoothly flow back to the main fluid chamber 32 from the secondary fluid chamber 29, thereby preventing generation of negative pressure in the main fluid chamber 32 in the same manner as described above. In this exemplary embodiment, the rubber film 35 and the air in the air chamber 30 form the auxiliary pressurizer according to the invention.

Eighth Exemplary Embodiment

Figure 8:
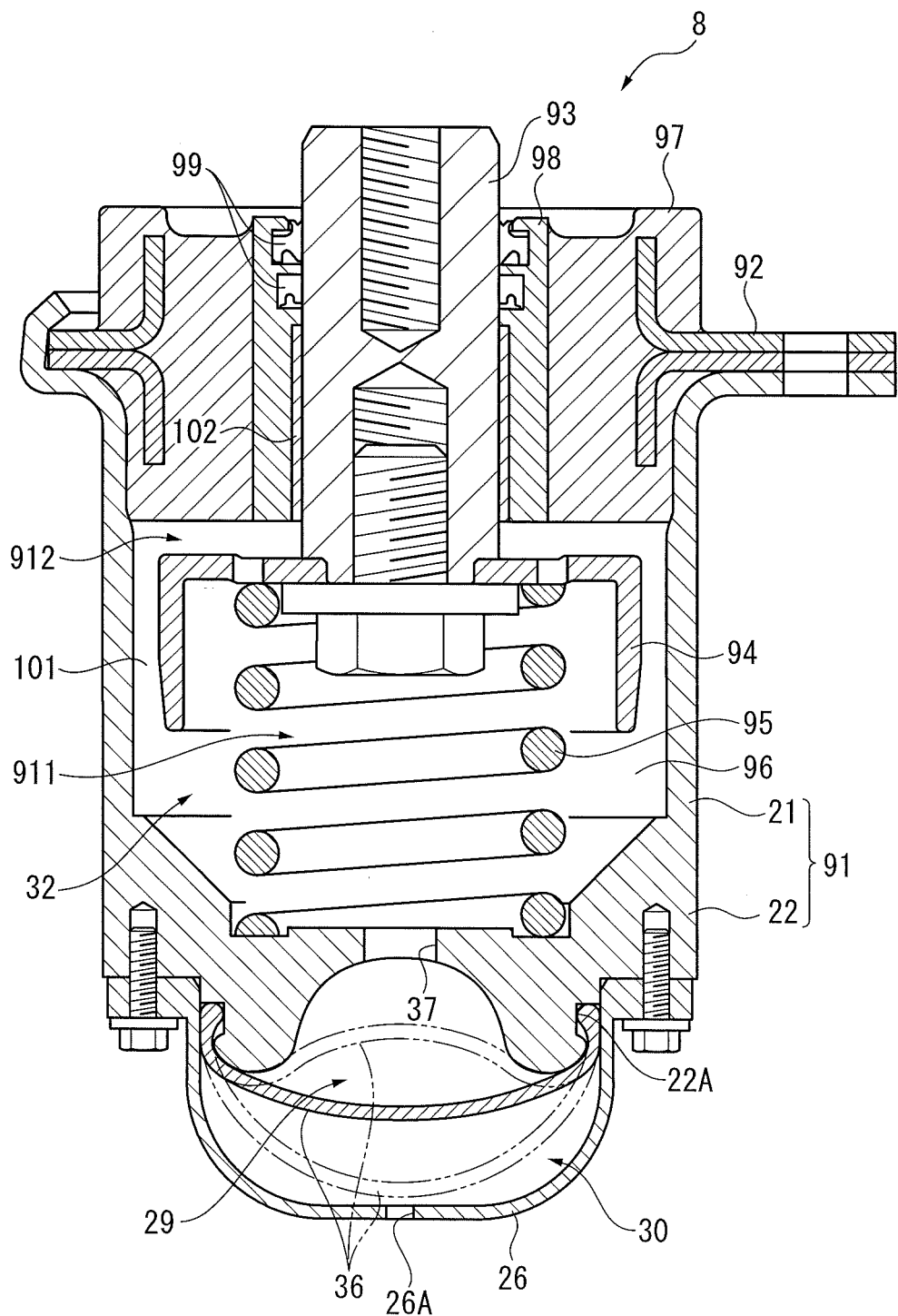
FIG. 8 is a cross sectional view showing a hydraulic mount according to an eighth exemplary embodiment of the invention.

In a hydraulic mount 8 according to an eighth exemplary embodiment shown in FIG. 8, unlike the seventh exemplary embodiment, the thin rubber film 35 is replaced by the thick rubber film 36, and the cap 26 is provided with the orifice 26A as an air vent.

In the hydraulic mount 8, unlike the hydraulic mount 7 of the seventh exemplary embodiment, use of a reaction force resulting from the shrinkage pressure of the air in the air chamber 30 cannot be expected but the elasticity of the rubber film 36 is usable instead. In order to return the rod 93 upward, the rubber film 36 itself functions as the auxiliary pressurizer to allow the high-viscosity fluid 96 in the secondary fluid chamber 29 to smoothly flow back to the main fluid chamber 32.

The effects of the use of the orifice 37 are the same as those in the fifth to seventh exemplary embodiments.

Ninth Exemplary Embodiment

Figure 9:
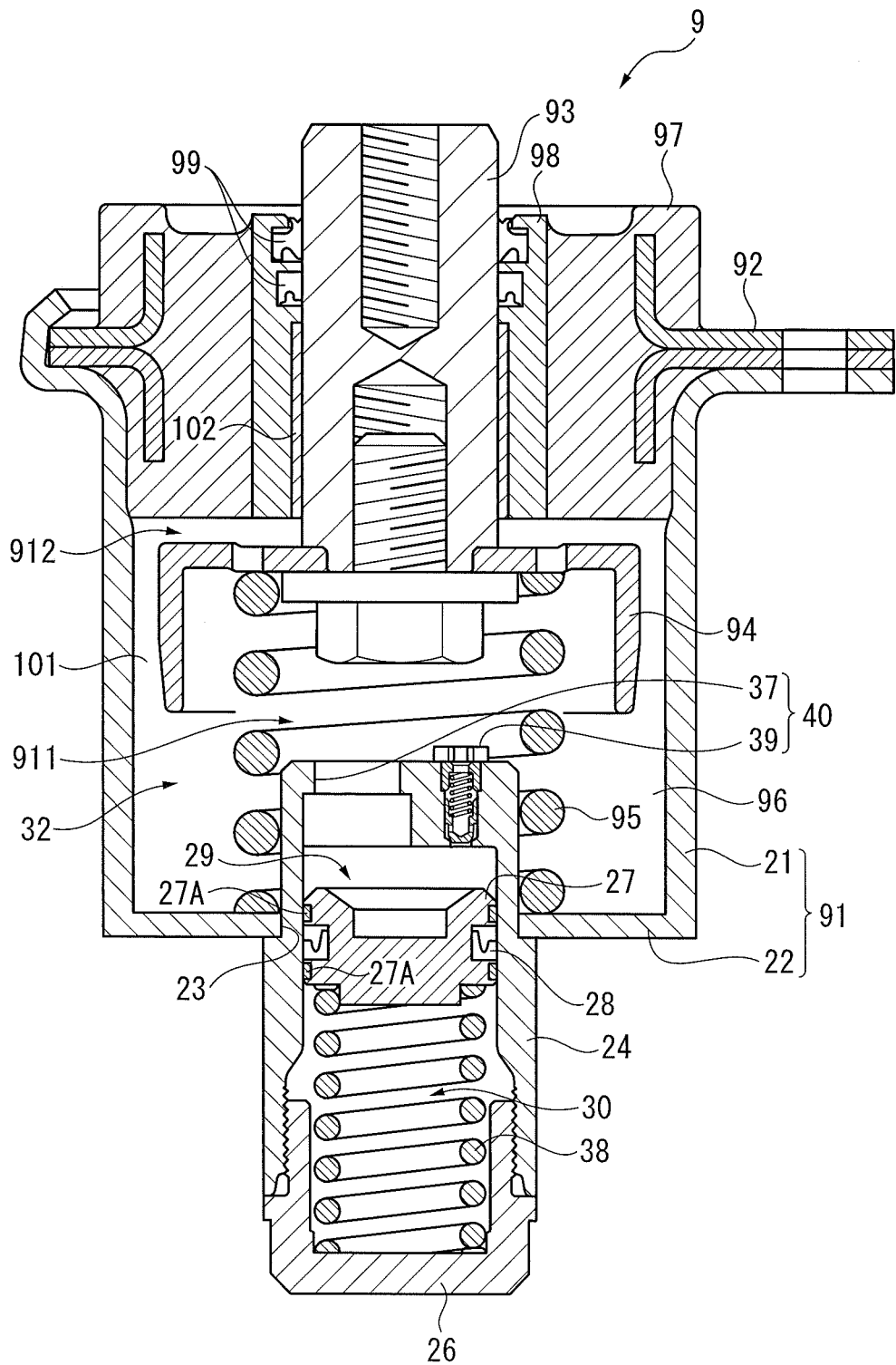
FIG. 9 is a cross sectional view showing a hydraulic mount according to a ninth exemplary embodiment of the invention.

A hydraulic mount 9 according to a ninth exemplary embodiment shown in FIG. 9 is provided by adding a check valve 39 to the hydraulic mount 5 of the fifth exemplary embodiment. The check valve 39 is located on the upper end of the cylinder along with the orifice 37 and is configured to allow the flow of the high-viscosity fluid 96 from the secondary fluid chamber 29 to the main fluid chamber 32 but not the flow from the main fluid chamber 32 to the secondary fluid chamber 29. The orifice 37 and the check valve 39 constitute a variable orifice 40.

With the check valve 39, the hydraulic mount 9 has the following effects in addition to the effects of the hydraulic mount 5 of the fifth exemplary embodiment.

Specifically, when the rod 93 returns upward after moving downward, the free piston 27 and the coil spring 38, which function as the auxiliary pressurizer, accessorily pressurize the secondary fluid chamber 29 and the high-viscosity fluid 96 in the secondary fluid chamber 29 easily flows back to the main fluid chamber 32 through the check valve 39. Thus, generation of negative pressure inside the main fluid chamber 32 can be further reliably prevented.

Further, in this exemplary embodiment, the high-viscosity fluid 96 in the secondary fluid chamber 29 flows back to the main fluid chamber 32 through the check valve 39, so that even when the opening area of the orifice 37 is reduced, the high-viscosity fluid 96 can reliably flow back. In view of the above, since the orifice 37 having a smaller opening area can be employed to obtain a larger differential pressure between the lower fluid chamber 911 and the upper fluid chamber 912, this exemplary embodiment is applicable to generate a larger necessary damping force. Incidentally, while the check valve 39 is used in this exemplary embodiment, any valve having the same function is usable. Further, a plurality of valves can be provided to increase an opening amount when the valves are opened.

Tenth Exemplary Embodiment

Figure 10:
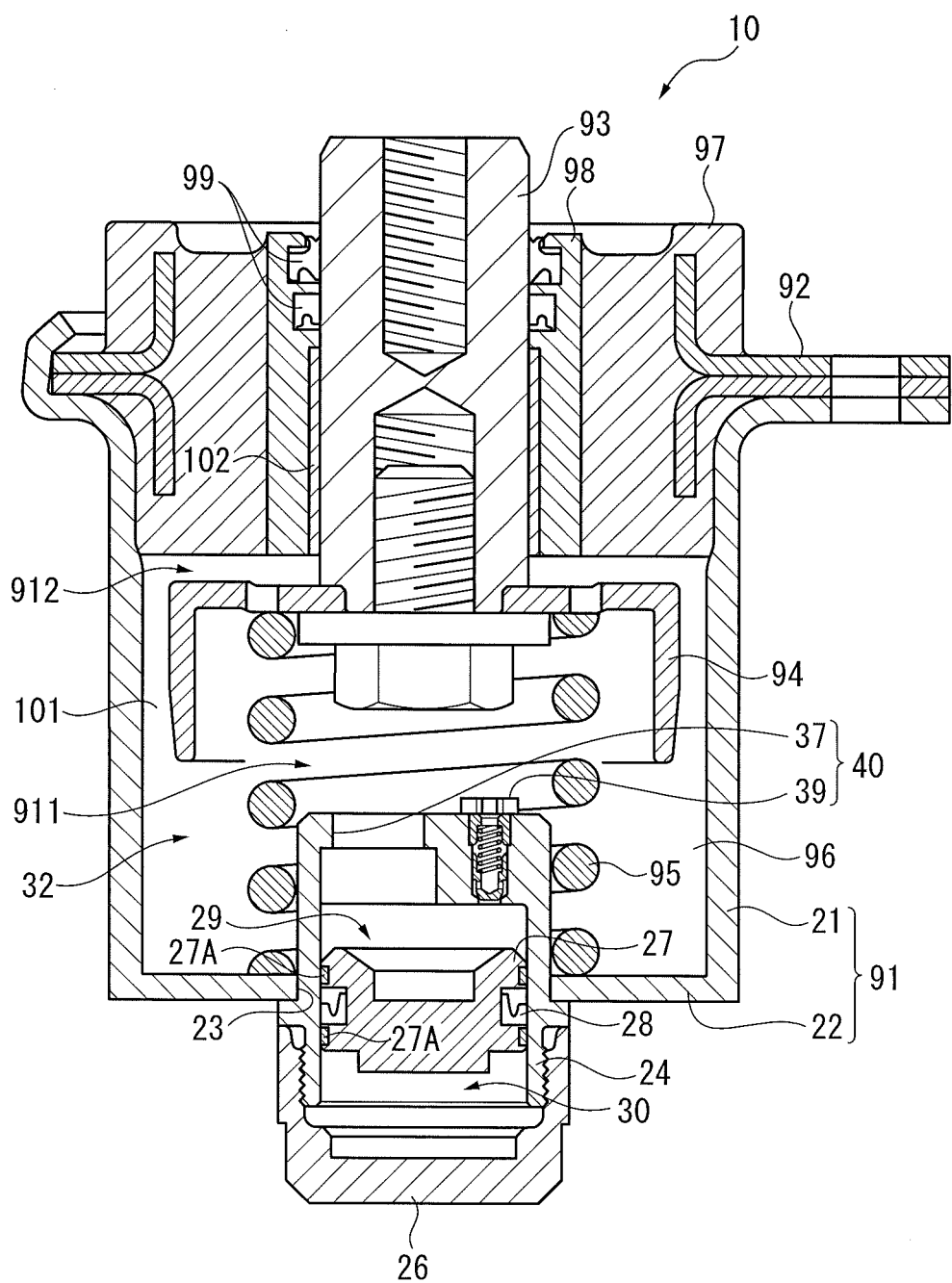
FIG. 10 is a cross sectional view showing a hydraulic mount according to a tenth exemplary embodiment of the invention.

A hydraulic mount 10 according to a tenth exemplary embodiment shown in FIG. 10 is provided by adding the check valve 39 to the hydraulic mount 6 of the sixth exemplary embodiment, and thus, offers not only the effects in the above exemplary embodiments but also the effects of the check valve 39 as described in the ninth exemplary embodiment.

Incidentally, either of the hydraulic mounts 7 and 8 of the seventh and eighth exemplary embodiments shown in FIGS. 7 and 8 can be provided with the check valve 39 (illustration thereof is omitted) to obtain the effects of the check valve 39.

Eleventh Exemplary Embodiment

Figure 11:
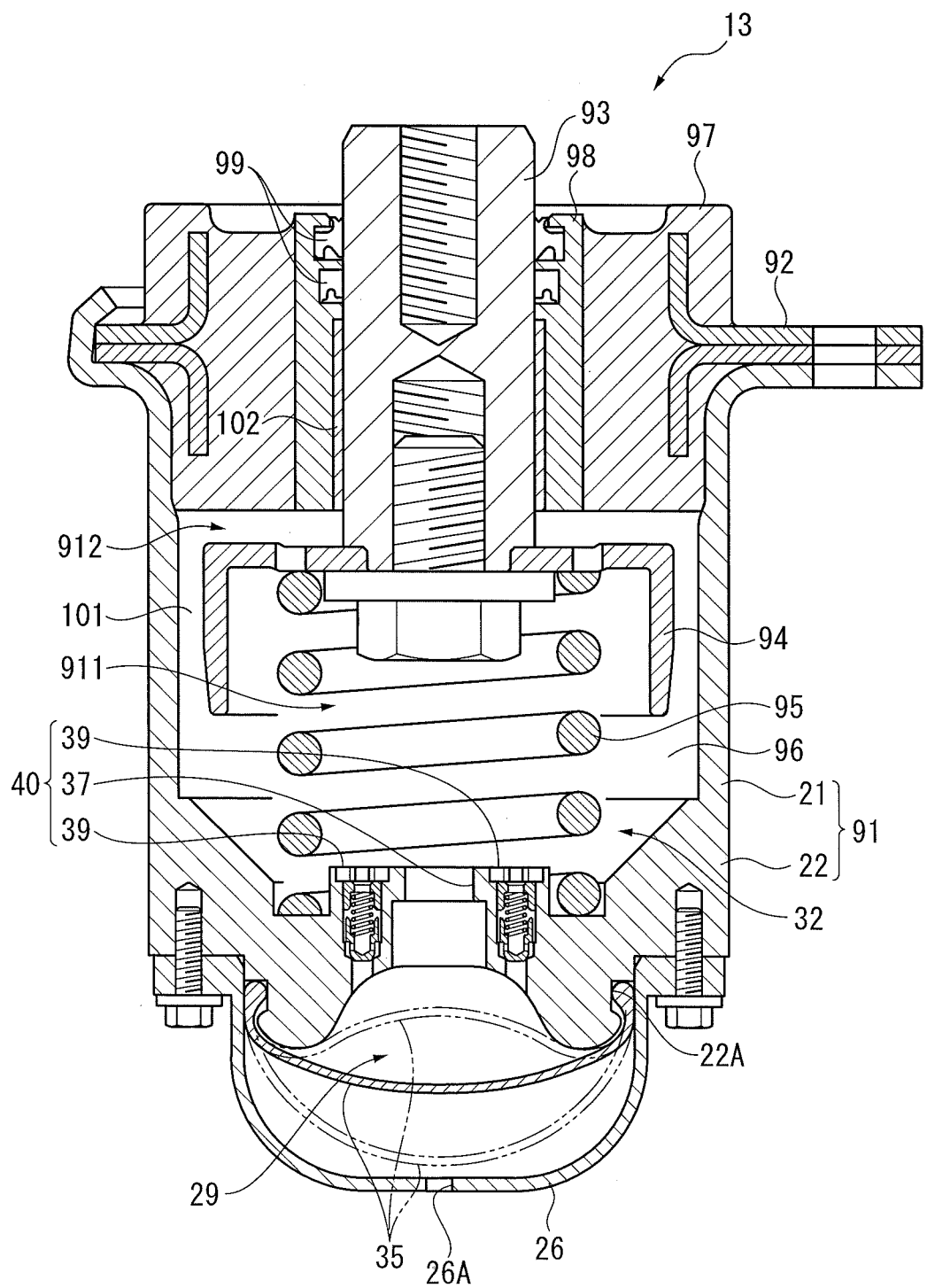
FIG. 11 is a cross sectional view showing a hydraulic mount according to an eleventh exemplary embodiment of the invention.

A hydraulic mount 13 according to an eleventh exemplary embodiment shown in FIG. 11 includes the thin rubber film 35, the cap 26 provided with the orifice 26A as an air vent, and the variable orifice 40.

In the hydraulic mount 13, during the downward movement of the rod 93, the orifice 37 itself serves to increase the inner pressure of the lower fluid chamber 911, and during the upward movement of the rod 93, the check valve 39 serves to suppress generation of negative pressure inside the main fluid chamber 32. Since the opening area of the orifice 37 can be reduced by using the check valve 39, the hydraulic mount 13 is also applicable to generate a larger necessary damping force.

Incidentally, though the best arrangements, methods and the like for carrying out the invention are disclosed above, the invention is not limited thereto. In other words, while the invention has been particularly explained and illustrated mainly in relation to specific embodiments, a person skilled in the art could make various modifications in terms of shape, quantity or other particulars to the above described embodiments without deviating from the technical idea or any object of the invention.

Accordingly, any descriptions of shape or quantity or the like disclosed above are given as examples to enable easy understanding of the invention, and do not limit the present invention, so that descriptions using names of components, with any such limitations of shape or quantity or the like removed in part or whole, are included in the present invention.

While the secondary fluid chamber 29 is located below the main fluid chamber 32 in the above exemplary embodiments, the secondary fluid chamber 29 may be located at the side of or above the main fluid chamber, since the secondary fluid chamber can be located at any position relative to the main fluid chamber.

Demonstration of Effects

Figure 13:
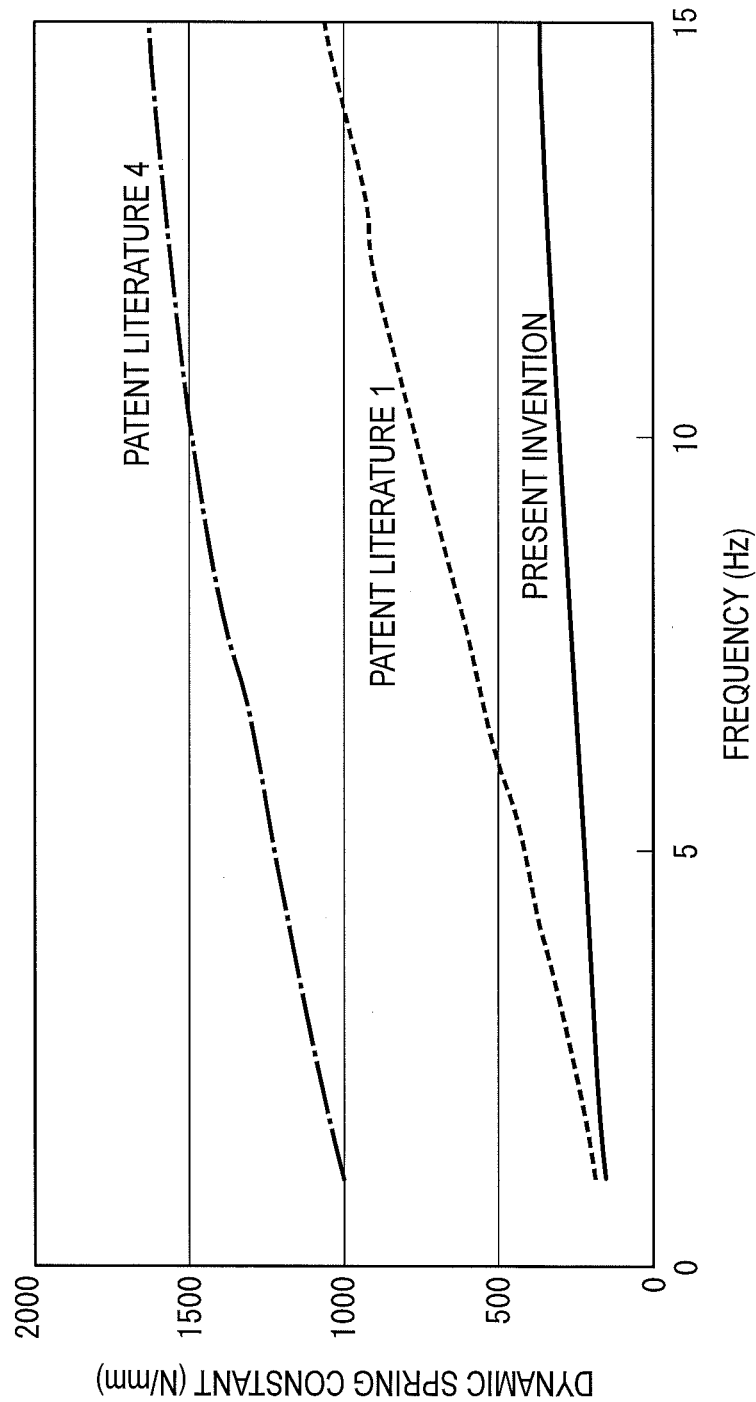
FIG. 13 shows a relationship between frequency and dynamic spring constant for explaining effects of the invention.
Figure 14:
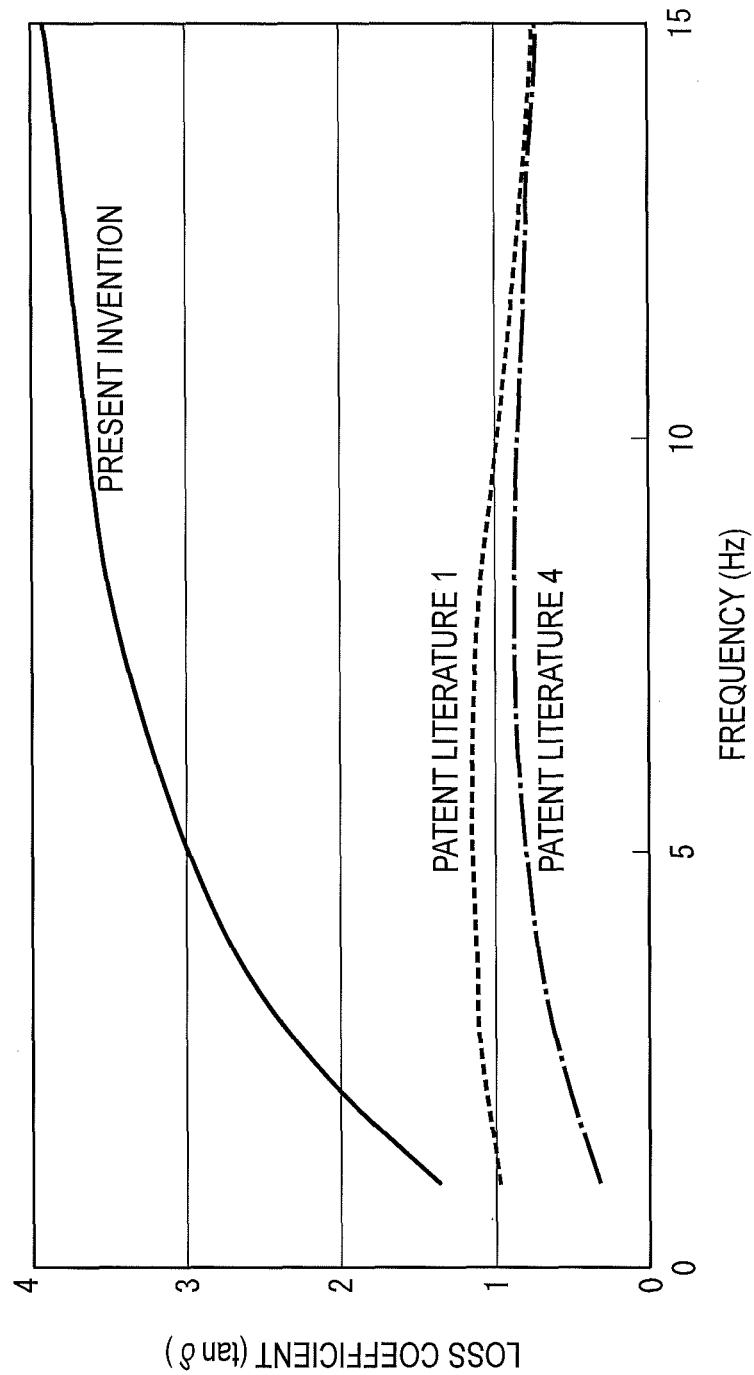
FIG. 14 shows a relationship between frequency and loss factor for explaining the effects of the invention.
Figure 15:
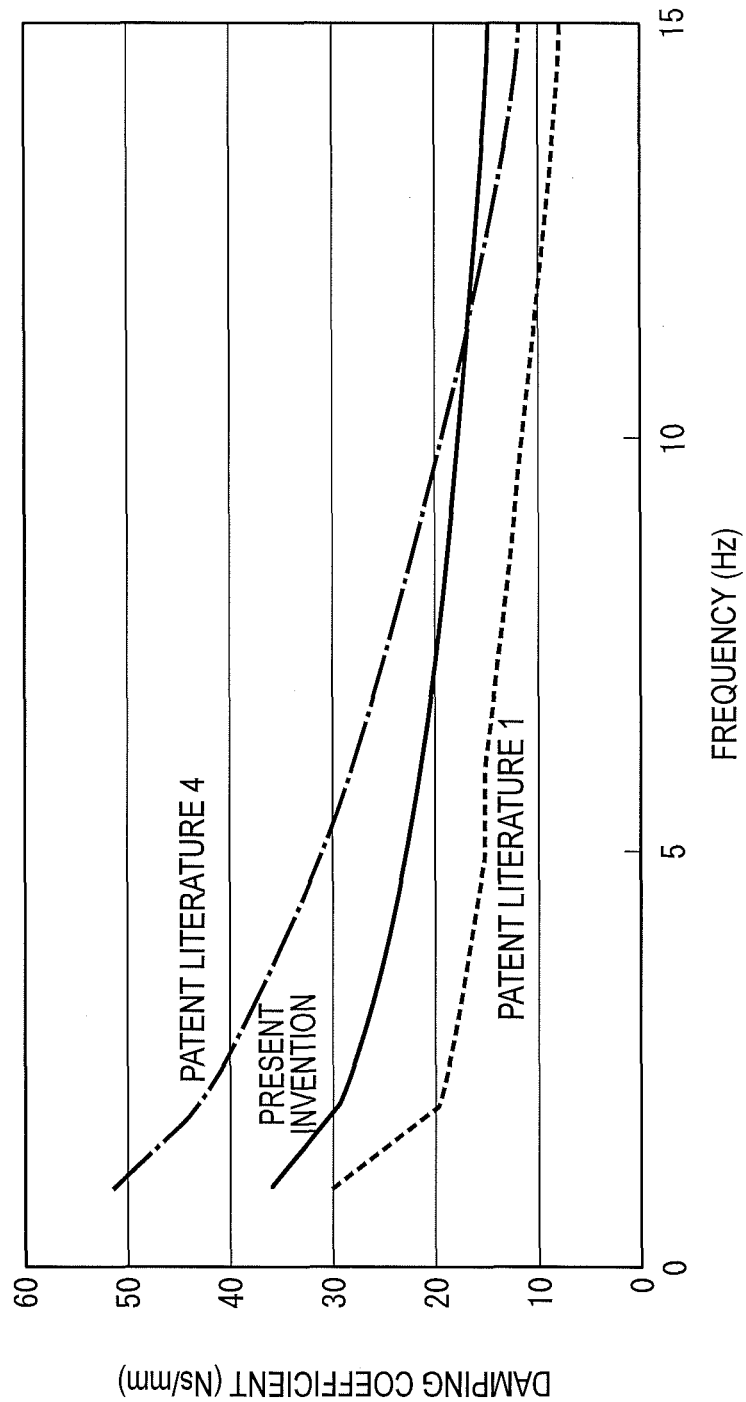
FIG. 15 shows a relationship between frequency and damping coefficient for explaining the effects of the invention.
Figure 16:
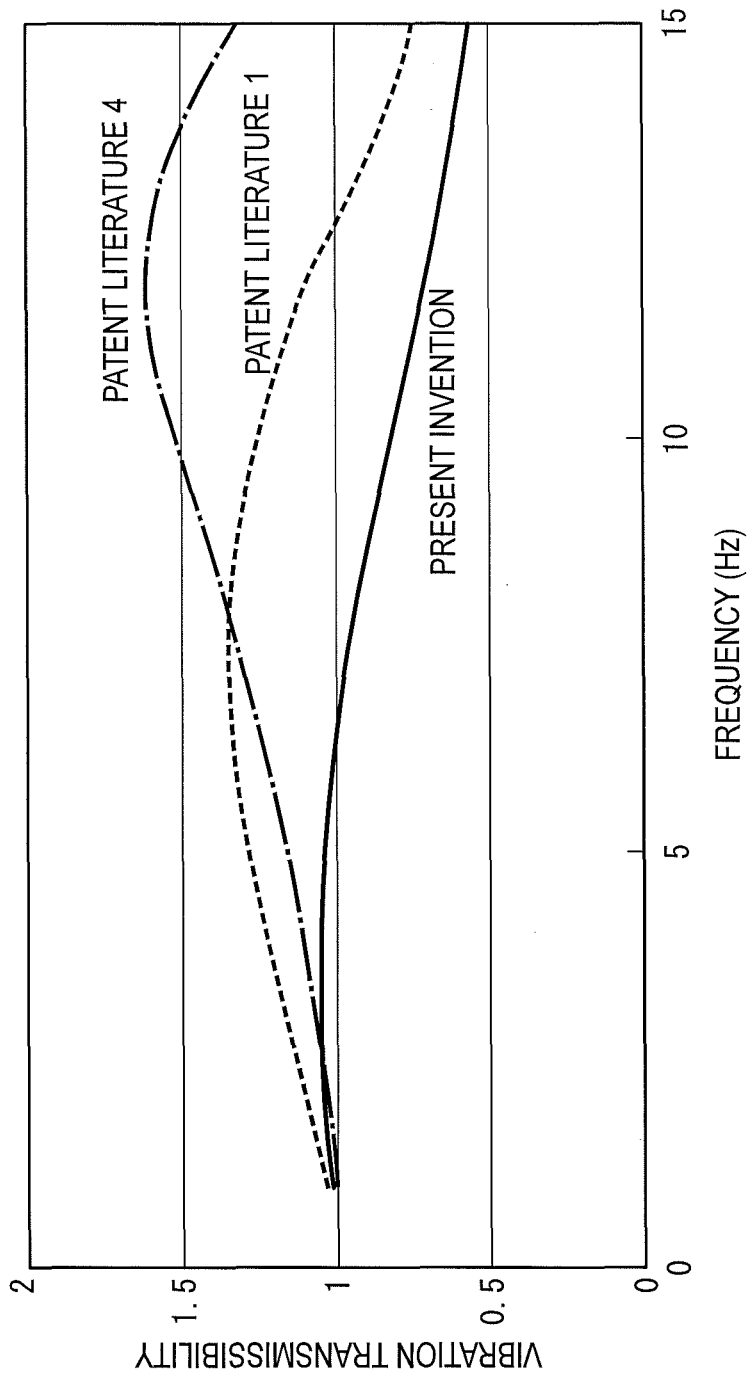
FIG. 16 shows a relationship between frequency and vibration transmissibility for explaining the effects of the invention.

Each of FIGS. 13 to 16 shows a graph for explaining the effects of the invention. Specifically, FIG. 13 shows a graph of a relationship between frequency (Hz) and dynamic spring constant (N/mm), FIG. 14 shows a graph of a relationship between frequency and loss factor (tan δ), FIG. 15 shows a graph of a relationship between frequency and damping coefficient (Ns/mm), and FIG. 16 shows a graph of a relationship between frequency and vibration transmissibility.

The lines in these figures denote the characteristics of the hydraulic mount 7 of the seventh exemplary embodiment as an example of the hydraulic mount according to the invention, the characteristics of the hydraulic mount disclosed in Patent Literature 1, and the characteristics of the hydraulic mount disclosed in Patent Literature 4.

Regarding the hydraulic mount of Patent Literature 4, as shown in FIG. 13, even the static spring constant (i.e., the dynamic spring constant when frequency is zero) is large, and thus, the dynamic spring constant becomes considerably larger as frequency becomes higher, so that vibration cannot be effectively reduced. The hydraulic mounts disclosed in Patent Literatures 2 and 3 (not shown), when being used as a cab mount of a construction machine, show substantially the same tendency to have a large static spring constant and a large dynamic spring constant in a high frequency band.

Regarding the hydraulic mount of Patent Literature 1, the static spring constant is small but the dynamic spring constant in a high frequency band is large, so that a difference therebetween is not eliminated. Thus, even this hydraulic mount does not seem to offer sufficient anti-vibration characteristics.

In contrast, the hydraulic mount 7 according to the invention can suppress the dynamic spring constant to a low level over a range from the low frequency band to the high frequency band. It has been found that such suppression of the dynamic spring constant, particularly, in the high frequency band leads to a significant improvement in the anti-vibration characteristics.

With reference to FIG. 14, it has been demonstrated that as compared with the hydraulic mounts of Patent Literatures 1 and 4, the hydraulic mount 7 according to the invention has a large loss factor (tan δ) (i.e., the values thereof are superior) over a range from the low frequency band to the high frequency band.

FIG. 15 shows damping coefficients obtained from the results shown in FIGS. 13 and 14. The larger damping coefficient is, the less vibration occurs. With reference to FIG. 15, the damping coefficient of the hydraulic mount 7 according to the invention is equal to or greater than that of the hydraulic mount of Patent Literature 1. Further, according to the seventh exemplary embodiment or any one of the other exemplary embodiments, it is possible to obtain a damping coefficient equal to that of Patent Literature 4 while maintaining the dynamic spring constant shown in FIG. 13. Specifically, according to the invention, it is possible to change the damping coefficient while maintaining a low dynamic spring constant. This is supposed to be because a high-viscosity fluid is used, instead of a low-viscosity fluid, for reducing the dynamic spring constant, so that the dynamic spring constant is reduced while the damping coefficient is maintained at a conventional level or higher.

With reference to FIG. 16, either of the hydraulic mounts of Patent Literatures 1 and 4 has a peak in vibration transmissibility in a frequency band of approximately 7 Hz to 12 Hz. In contrast, in the hydraulic mount 7 according to the invention, there is no obvious peak. The vibration transmissibility tends to become smaller as frequency becomes higher from the initial state, and the values of the vibration transmissibility are relatively small. Thus, it has been demonstrated that the anti-vibration characteristics of the hydraulic mount 7 is the most excellent. In other words, the invention is capable of suppressing cab vibration at a low frequency and offering an excellent anti-vibration effect.

The invention is not limited to be applicable only to a hydraulic mount for supporting the cab of a construction machine, a transit vehicle, an earth-moving machine or the like, but applicable to a hydraulic mount for supporting a heavy load such as an engine.

1 to 13 . . . hydraulic mount, 22 . . . bottom, 27 . . . free piston, 29 . . . secondary fluid chamber, 31, 38 . . . coil spring, 32 . . . main fluid chamber, 33 . . . compressed air, 35, 36 . . . rubber film as movable film, 37 . . . orifice, 39 . . . check valve, 91 . . . container, 93 . . . rod, 94 . . . damper plate, 95 . . . spring, 96 . . . high-viscosity fluid, 97 . . . rubber mount, 101 . . . clearance as damping force generator, 912 . . . upper fluid chamber, 911 . . . lower fluid chamber

The invention claimed is:

1. A hydraulic mount comprising:
   a container configured to liquid-tightly seal a high-viscosity fluid therein;
   a rubber mount that is provided on an upper side of the container;
   a rod that is configured to move reciprocatively relative to the high-viscosity fluid in the container, the rod being configured to move slidably relative to the rubber mount;
   a damper plate that is provided to an end of the rod and located in a portion of the container that contains the high-viscosity fluid, the damper plate including an outer circumferential surface that is fully continuous along an entire circumference of the damper plate and is opposed to and spaced apart from an inner circumferential surface of the container, a fully continuous and circumferential clearance being defined between the outer circumferential surface and the inner circumferential surface to provide a flow path for the high-viscosity fluid, wherein the damper plate is continuous such that a downward movement of the damper plate causes the high-viscosity fluid vertically below the damper plate to flow through the clearance, the flow of the high-viscosity fluid through the clearance generating a damping force;
   a main fluid chamber that includes an upper fluid chamber and a lower fluid chamber provided by vertically dividing an interior of the container by the damper plate; and
   a pressurizer that is configured to move in accordance with a movement of the high-viscosity fluid in the main fluid chamber based on an axial movement of the rod to thereby correspondingly pressurize the sealed high-viscosity fluid so that the pressurized high-viscosity fluid moves to the upper fluid chamber through the clearance.

2. The hydraulic mount according to claim 1, further comprising:
   a secondary fluid chamber that communicates with the main fluid chamber and has a variable volume, wherein
   the pressurizer includes an orifice that defines a communicating portion between the main fluid chamber and the secondary fluid chamber.

3. The hydraulic mount according to claim 2, wherein
   the communicating portion is provided with a valve that allows a flow of the high-viscosity fluid from the secondary fluid chamber to the main fluid chamber but not a flow of the high-viscosity fluid from the main fluid chamber to the secondary fluid chamber.

4. The hydraulic mount according to claim 1, wherein
   the pressurizer allows pressurization equal to or above a differential pressure caused between the upper fluid chamber and the lower fluid chamber.

5. The hydraulic mount according to claim 1, wherein
   the pressurizer includes a free piston that is movable in conjunction with a flow of the high-viscosity fluid from the main fluid chamber.

6. The hydraulic mount according to claim 5, wherein
   the pressurizer includes a coil spring, an air chamber or a gas chamber that biases the free piston.

7. The hydraulic mount according to claim 1, wherein
   the pressurizer includes a movable film that is movable in conjunction with a flow of the high-viscosity fluid from the main fluid chamber.

8. The hydraulic mount according to claim 7, wherein
   the pressurizer includes an air chamber or a gas chamber that biases the movable film.

9. The hydraulic mount according to claim 1, further comprising:

a spring that is interposed between the damper plate and a bottom of the container.

10. The hydraulic mount according to claim 1, wherein an inside of the main fluid chamber is entirely filled with the high-viscosity fluid.

* * * * *